US010136385B2

(12) United States Patent
Sakai et al.

(10) Patent No.: US 10,136,385 B2
(45) Date of Patent: Nov. 20, 2018

(54) INFORMATION PROCESSING DEVICE AND INFORMATION PROCESSING METHOD

(71) Applicant: SONY CORPORATION, Tokyo (JP)

(72) Inventors: Eisuke Sakai, Tokyo (JP); Yusuke Tanaka, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/540,594

(22) PCT Filed: Dec. 25, 2015

(86) PCT No.: PCT/JP2015/086251
§ 371 (c)(1),
(2) Date: Jun. 29, 2017

(87) PCT Pub. No.: WO2016/143233
PCT Pub. Date: Sep. 15, 2016

(65) Prior Publication Data
US 2017/0367040 A1 Dec. 21, 2017

(30) Foreign Application Priority Data
Mar. 6, 2015 (JP) ................. 2015-045326

(51) Int. Cl.
H04W 52/02 (2009.01)
H04W 84/12 (2009.01)
(Continued)

(52) U.S. Cl.
CPC ....... *H04W 52/0206* (2013.01); *H04W 52/02* (2013.01); *H04W 52/0219* (2013.01);
(Continued)

(58) Field of Classification Search
CPC ... H04W 4/02; H04W 52/02; H04W 52/0216; H04W 52/0209; H04W 8/005;
(Continued)

(56) References Cited

U.S. PATENT DOCUMENTS

2006/0126577 A1* 6/2006 Yano ..................... H04W 36/38
370/337
2006/0227801 A1 10/2006 Nanda et al.
(Continued)

FOREIGN PATENT DOCUMENTS

JP 2007-531410 A 11/2007
JP 2011-503999 A 1/2011
(Continued)

OTHER PUBLICATIONS

International Search Report dated Mar. 8, 2016, in PCT/JP2015/086251, filed Dec. 25, 2015.

*Primary Examiner* — Thanh Le
(74) *Attorney, Agent, or Firm* — Xsensus, LLP

(57) ABSTRACT

Modes on power consumption are suitably set. There is provided an information processing device including a control section. When the information processing device in a first mode transitions to a second mode in which the information processing device consumes power differently than in the first mode, the control section performs control to transmit at least one frame. Upon transmitting the frame, the control section inserts into the frame information for notifying a first device compatible with the second mode that the information processing device will transition to the second mode, and information for causing a second device incompatible with the second mode to suppress transmission.

20 Claims, 26 Drawing Sheets

(51) Int. Cl.
*H04W 92/18* (2009.01)
*H04W 72/12* (2009.01)

(52) U.S. Cl.
CPC .......... *H04W 84/12* (2013.01); *H04W 92/18* (2013.01); *H04W 72/12* (2013.01); *Y02D 70/00* (2018.01); *Y02D 70/142* (2018.01); *Y02D 70/164* (2018.01); *Y02D 70/166* (2018.01); *Y02D 70/21* (2018.01); *Y02D 70/22* (2018.01)

(58) Field of Classification Search
CPC ... H04W 76/023; H04W 88/02; H04W 36/38; G07C 9/00182
See application file for complete search history.

(56) References Cited

U.S. PATENT DOCUMENTS

| | | | |
|---|---|---|---|
| 2010/0271995 | A1 | 10/2010 | Seok et al. |
| 2012/0224521 | A1 | 9/2012 | Zhu et al. |
| 2013/0121223 | A1* | 5/2013 | Sugitani ................ H04W 52/02 370/311 |
| 2014/0300448 | A1* | 10/2014 | Ochiai ................ G07C 9/00182 340/5.72 |
| 2017/0311143 | A1* | 10/2017 | Yamaura ............. H04W 76/023 |

FOREIGN PATENT DOCUMENTS

| | | |
|---|---|---|
| JP | 2013-106348 A | 5/2013 |
| JP | 2014-507093 A | 3/2014 |

\* cited by examiner

EXAMPLE OF POWER SAVE INFORMATION (ELEMENT)

FIG. 5

EXAMPLE OF USING HE PPDU FORMAT FRAME AS SLEEP FRAME

| Octets: | | | | | | 2 | 2 | 6 | 6 | 6 | 2 | 0–7951 | 4 |
|---|---|---|---|---|---|---|---|---|---|---|---|---|---|
| L-STF | L-LTF | L-SIG | HE-SIG-A | HE-STF | HE-LTF | HE-SIG-B | Frame Control | Duration | Address 1 | Address 2 | Address 3 | Sequence Control | Frame Body | FCS |
| 311 | 312 | 313 | 314 | 315 | 316 | 317 | 318 | 319 | 320 | 321 | 322 | 323 | 324 | 325 |

PHY-Header / MAC-Header

TYPICAL STRUCTURE OF L-SIG

EXAMPLE IN WHICH SLEEP FRAME IDENTIFIER IS SET IN FRAME BODY

EXAMPLE OF CONTROL FRAME FORMAT

EXAMPLE OF USING NDP (NULL DATA PACKET) FRAME AS SLEEP FRAME

EXAMPLE IN WHICH SLEEP FRAME IDENTIFIER IS SET IN HE-SIG

TYPICAL OPERATION OF SLEEP FRAME RECEPTION PROCESSING (SLAVE STATION)

TYPICAL OPERATION OF PROCESSING PERFORMED WHEN MASTER STATION IS IN SLEEP MODE (SLAVE STATION)

TYPICAL OPERATION OF TRANSMISSION SUPPRESSION PROCESSING (LEGACY DEVICE)

EXAMPLE OF USING CTS FORMAT FRAME AS FIRST SLEEP FRAME

OTHER EXAMPLE OF HE GF PPDU FRAME PHY HEADER

EXAMPLE OF USING BACKWARD-INCOMPATIBLE NDP FORMAT FRAME AS SECOND SLEEP FRAME

INFORMATION PROCESSING DEVICE AND INFORMATION PROCESSING METHOD

TECHNICAL FIELD

The present technology relates to an information processing device. More particularly, the present technology relates to an information processing device and an information processing method for exchanging information by use of wireless communication.

BACKGROUND ART

There exist wireless communication technologies for exchanging information by use of wireless communication. For example, the standards regarding wireless local area networks (LANs) recommended by the Institute of Electrical and Electronic Engineers (IEEE) 802.11 are coming into widespread use. Also proposed is wireless fidelity (Wi-Fi) Direct (Wi-Fi peer-to-peer (P2P) Specification), a standard for allowing multiple wireless devices to directly exchange data therebetween on a P2P basis without the intervention of routers.

The Wi-Fi Direct standard defines a notice of absence (NoA) as the protocol for enabling a wireless device acting as a wireless base unit called a group owner (GO) to enter sleep mode. Specifically, the standard allows the GO to set sleep mode by notifying its clients beforehand of a sleep start time, a sleep duration, and other settings using a beacon, for example.

As a typical technology regarding the NoA, a portable terminal that enters suspend mode using the NoA has been proposed (e.g., see PTL 1).

CITATION LIST

Patent Literature

[PTL 1]
JP 2013-106348 A

SUMMARY

Technical Problem

According to the above-mentioned existing technology, if all devices connected to the GO are Wi-Fi Direct compatible devices, the GO sets sleep mode (suspend mode) by notifying its clients of the sleep start time, sleep duration, and other settings.

However, there may be cases where the GO is connected with Wi-Fi Direct incompatible devices. If the GO is connected with a Wi-Fi Direct incompatible device, the Wi-Fi Direct incompatible device is incapable of determining whether or not the GO is in sleep mode. Conceivably, the Wi-Fi Direct incompatible device may transmit data to the GO that is in sleep mode. In such a case, communication is not conducted properly between the Wi-Fi Direct incompatible device and the GO in sleep mode. It is important that sleep mode (suspend mode) be set appropriately even if the GO is connected with Wi-Fi Direct incompatible devices.

The present technology has been developed in view of the above circumstances. An object of the present technology is to set the modes on power consumption in a suitable manner.

Solution to Problem

The present technology has been devised in order to solve the above-mentioned problem. According to a first aspect of the present technology, there are provided an information processing device, an information processing method for use therewith, and a program for causing a computer to execute the information processing method. The information processing device includes a control section configured such that when the information processing device in a first mode transitions to a second mode in which the information processing device consumes power differently than in the first mode, the control section performs control to transmit at least one frame including information notifying a first device compatible with the second mode that the information processing device is to transition to the second mode, the frame further including information causing a second device incompatible with the second mode to suppress transmission. This technology provides an effect such that when the own device transitions to the second mode, a frame is transmitted which includes information for notifying the first device compatible with the second mode that the own device will transition to the second mode, and information for causing the second device incompatible with the second mode to suppress transmission.

According to the first aspect of the present technology, on the basis of a determining rule, the control section may postpone a scheduled time of transmitting the frame before transmitting the frame. This provides the effect of postponing the scheduled time of transmitting the frame.

Also according to the first aspect of the present technology, the control section may notify the first device and the second device of a scheduled time of transmitting the frame before transmitting the frame. This provides the effect of notifying the first device and the second device of the scheduled time of transmitting the frame before transmitting the frame.

Also according to the first aspect of the present technology, the control section may transmit the scheduled time using a broadcast frame. This provides the effect of transmitting the scheduled time using the broadcast frame.

Also according to the first aspect of the present technology, the control section may base the determining rule on information relating to the frame transmitted to the information processing device. This provides the effect of basing the determining rule on information relating to the frame transmitted to the own device.

Also according to the first aspect of the present technology, the control section may stop transmission of the frame on the basis of a determining rule. This provides the effect of stopping transmission of the frame on the basis of the determining rule.

Also according to the first aspect of the present technology, the control section may base the determining rule on the receipt from an upper layer of data destined for another information processing device connected with the information processing device by a scheduled time of transmitting the frame. This provides the effect of basing the determining rule on the receipt from an upper layer of data destined for another information processing device connected with the own device by the scheduled time of transmitting the frame.

Also according to the first aspect of the present technology, the control section may base the determining rule on the receipt of another frame destined for the information processing device by a scheduled time of transmitting the frame. This provides the effect of basing the determining rule on the receipt of another frame destined for the own device by the scheduled time of transmitting the frame.

Also according to the first aspect of the present technology, the control section may transmit as part of the frame a first frame causing the first device and the second device to suppress transmission. This provides the effect of transmitting the first frame causing the first device and the second device to suppress transmission.

Also according to the first aspect of the present technology, the control section may transmit as part of the frame a second frame of which the information is not recognized by the second device. This provides the effect of transmitting the second frame of which the information is not recognized by the second device.

Also according to the first aspect of the present technology, the control section may insert into the frame an identifier identifying the information processing device and duration information specifying duration in which the information processing device is to transition to the second mode before transmitting the frame. This provides the effect of inserting into the frame the identifier for identifying the own device and the duration information for specifying the duration of the transition to the second mode before transmitting the frame.

Also according to the first aspect of the present technology, the control section may insert the identifier and the duration information into at least either a physical layer (PHY) header or a media access control (MAC) header of the frame before transmitting the frame. This provides the effect of inserting the identifier and the duration information into at least either the PHY header or the MAC header of the frame before transmitting the frame.

Also according to the first aspect of the present technology, the control section may set a destination of the frame for the information processing device. This provides the effect of setting the destination of the frame for the own device.

Also according to the first aspect of the present technology, as a waiting duration before transmitting the frame, the control section may set a duration guaranteed to be shorter than the duration in which each of the first device and the second device waits for transmission. This provides the effect of setting a duration guaranteed to be shorter than the duration in which each of the first device and the second device waits for transmission, as the waiting duration before transmitting the frame.

According to a second aspect of the present technology, there are provided an information processing device, an information processing method for use therewith, and a program causing a computer to execute the information processing method. The information processing device includes a communication section configured to receive a frame transmitted by another information processing device in a first mode notifying that the other information processing device is to transition to a second mode in which the other information processing device consumes power differently than in the first mode, the frame including information enabling the other information processing device to notify a first device compatible with the second mode that the other information processing device is to transition to the second mode, the frame further including information causing a second device incompatible with the second mode to suppress transmission. The information processing device further includes a control section configured to perform control regarding the transmission of the own device on the basis of the information included in the frame. This provides an effect such that upon receipt of the frame including diverse information, the transmission of the own device is controlled on the basis of the information included in the frame.

According to the second aspect of the present technology, the control section may determine whether the frame is for notifying that the other information processing device is to transition to the second mode on the basis of whether or not a source address and a destination address included in the frame coincide with each other. This provides the effect of determining whether the frame is for notifying that the other information processing device will transition to the second mode on the basis of whether or not the source address and the destination address included in the frame coincide with each other.

Also according to the second aspect of the present technology, the control section may set a duration in which the own device is to transition to the second mode on the basis of a duration included in the frame as the duration in which the other information processing device is to transition to the second mode. This provides the effect of setting the duration in which the own device will transition to the second mode on the basis of the duration included in the frame as the duration in which the other information processing device will transition to the second mode.

Also according to the second aspect of the present technology, if there is a frame to be transmitted to the other information processing device and if a waiting duration required before transmitting the frame is longer than a duration at the end of which the other information processing device is to exit the second mode, the control section may perform processing of transmitting the frame. This provides the effect of performing the processing of transmitting the frame if there is a frame to be transmitted to the other information processing device and if a waiting duration required before transmitting the frame is longer than the duration in which the other information processing device will transition to the second mode.

Also according to the second aspect of the present technology, if there is a frame to be transmitted and if the frame is destined for an entity other than the other information processing device, the control section may perform processing of transmitting the frame. This provides the effect of performing the processing of transmitting the frame if there is a frame to be transmitted and if the frame is destined for an entity other than the other information processing device.

Advantageous Effect of Invention

The present technology provides the advantage of suitably setting the modes on power consumption. This and other advantages outlined above, however, are not limitative of the technology. The present technology also offers other advantages that will be apparent in the disclosure that follows.

BRIEF DESCRIPTION OF DRAWINGS

FIG. 5 is a schematic view showing a typical structure of a Sleep frame transmitted by the information processing device 100 in the first embodiment of the present technology.

DESCRIPTION OF EMBODIMENTS

Described below are the modes for carrying out the present technology (called the embodiments hereunder). The description will be given under the following headings:

1. First Embodiment (an example in which a Sleep frame is transmitted immediately before the master station enters sleep mode)
2. Second Embodiment (an example in which two kinds of frames are transmitted as the Sleep frame)
3. Applications 1. First Embodiment (Typical Configuration of the Communication System)

Figure 1:
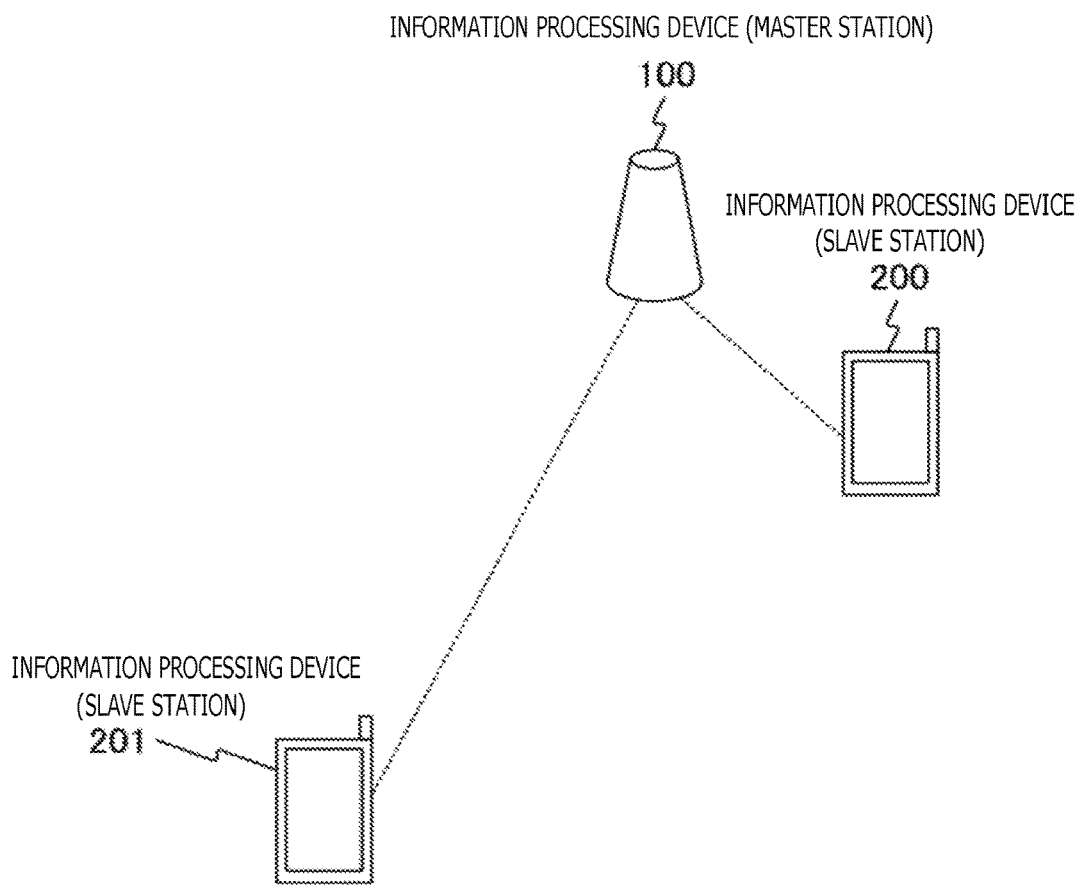
FIG. 1 is a schematic view showing a typical system configuration of a communication system 10 in a first embodiment of the present technology.

FIG. 1 is a schematic view showing a typical system configuration of a communication system 10 in a first embodiment of the present technology.

The communication system 10 is made up of an information processing device (master station) 100 and information processing devices (slave stations) 200 and 201. In the ensuing description, the notations of the master station and slave stations may be abbreviated as needed. In FIG. 1, the devices connected with each other are shown linked by dotted lines.

The information processing device 100 is an information processing device (wireless communication device) serving as the hub of a wireless network. The information processing device 100 may be connected in wired or wireless fashion with an external network (e.g., the Internet). The information processing device 100 may be a fixed or mobile information processing device having a wireless communication function. For example, the fixed information processing device is an information processing device such as an access point or a base station in a wireless LAN system. The mobile information processing device may be an information processing device such as a smartphone, a mobile phone, or a tablet.

For example, the information processing devices 200 and 201 are each a mobile information processing device (wireless communication device) having a wireless communication function.

The information processing devices 100, 200, and 201 each have a communication function compatible with the IEEE 802.11 wireless LAN standards, for example. The wireless LAN complies with Wi-Fi, Wi-Fi Direct, or Wi-Fi CERTIFIED Miracast (technical specification name: Wi-Fi Display), for example. The wireless LAN may alternatively comply with some other suitable communication system for wireless communication.

The information processing device 100 functions as the master station (base unit), and the information processing devices 200 and 201 each function as a slave station (extension unit). The information processing device 100 also functions as an access point under which the information processing devices 200 and 201 operate. That is, FIG. 1 shows an example in which there is one wireless master station (information processing device 100) with which two wireless slave stations (information processing devices 200 and 201) are connected. This, however, is not limitative of the system configuration of the embodiments according to the present technology. Although FIG. 1 illustrates a communication system constituted by one wireless master station and two wireless slave stations, the number of master stations and that of slave stations are not limited thereby. For example, the present technology may be applied to a communication system including two or more wireless master stations (information processing devices). This technology may also be applied to a communication system including three or more wireless slave stations (information processing devices).

One of two information processing devices communicating with each other may be a master station and the other a slave station. Alternatively, two interconnected information processing devices may be two slave stations communicating directly with each other.

The information processing devices 100 and 200 each include a specific function (i.e., a function for supporting sleep mode). On the other hand, the information processing device 201 has no such specific function. The information processing devices devoid of the specific function are referred to as legacy devices. The specific function will be discussed hereunder in conjunction with each of the embodiments of the present technology. The legacy device may be defined as an information processing device having a communication function complying with the wireless LAN standards of IEEE 802.11a, IEEE 802.11g, IEEE 802.11n, or IEEE 802.11ac, for example.

As described above, the information processing device 201 is a slave station operating as a legacy device. The information processing device 200 is a slave station that is not a legacy device.

Mobile wireless devices such as mobile phones are driven by battery. That means the technology and scheme to save power are important for these devices. For example, power is consumed when radio signals are transmitted and received. Thus in order to minimize power consumption, each mobile wireless device when not required to communicate may transition to suspend mode in which a wireless system is driven with a minimum of power with no radio signal transmitted or received.

For example, IEEE 802.11, a typical wireless LAN standard, defines a protocol under which a wireless extension unit, before entering suspend mode (sleep mode) for a certain duration, transmits to its wireless base unit a frame notifying that the extension unit will transition to suspend mode.

Recent years have witnessed the appearance of wireless mobile devices (e.g., Soft access point (AP)) playing the role of a wireless base unit. This gives importance to a wireless system enabling the wireless base unit to save power efficiently.

For example, as described above, the Wi-Fi Direct standard defines the NoA as the protocol according to which the wireless device acting as the wireless base unit (GO) enters sleep mode. The NoA, however, is not backward compatible.

For example, if the GO is connected with a Wi-Fi Direct incompatible device (legacy device) for example, that device cannot determine whether or not the GO is in sleep mode. Thus the Wi-Fi Direct incompatible device may conceivably send data to the GP in sleep mode. In such a case, communication is not carried out correctly between the Wi-Fi Direct incompatible device and the GO in sleep mode.

As described above, if the GO is connected with a Wi-Fi Direct incompatible device, the NoA scheme may not let the wireless base unit save power appropriately.

The embodiment of the present technology provides an example in which the wireless base unit transmits a Sleep frame just before entering sleep mode. That is, the master station under IEEE 802.11ax transmits the Sleep frame at the time of setting suspend mode (power save mode). The Sleep frame at least includes a notification of the sleep duration of the own device and information for causing legacy devices to suppress transmission.

The Sleep frame thus transmitted gives a wireless extension unit capable of recognizing the Sleep frame (a device compatible with this method (e.g., IEEE 802.11ax compatible device)) the notification that the base unit will enter sleep mode (e.g., for a sleep duration). On the other hand, the Sleep frame causes a wireless extension unit incapable of recognizing the Sleep frame (a legacy device incompatible with this method) to suppress transmission. For example, transmission suppression may be set using the network allocation vector (NAV).

It is also possible to set properly the format of the Sleep frame for enabling the base unit to save power.

With the embodiment of the present technology, when sleep mode is set for the master station, the setting is assumed to mean not only the state in which the master station is in sleep mode but also the state where the master station performs various (e.g., limited) processes. That is, in the sleep duration, the master station does not need to transition to suspend mode by turning off its wireless power supply. For example, in the sleep duration, the master station may perform such processes as scanning other channels to check an ambient wireless environment and communicating with another master station or slave stations being connected (including P2P connections). If the normal state is regarded as a first mode, sleep mode may be considered to be a second mode in which power is consumed differently from the first mode. The mention of sleep mode includes the meaning of suspend mode or power save mode. The normal state of the master station is an example of the first mode stated in the appended claims. Sleep mode is an example of the second mode stated in the appended claims.

(Typical Structure of the Information Processing Device (Master Station))

Figure 2:
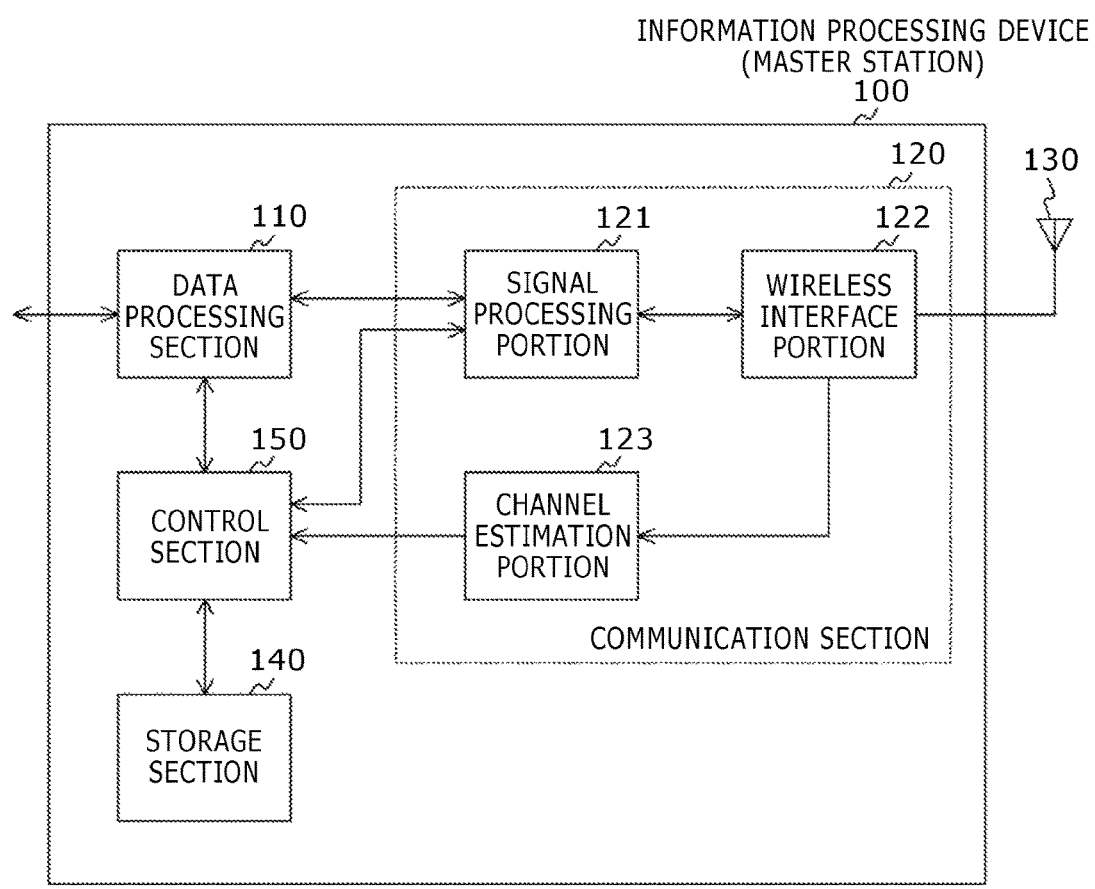
FIG. 2 is a block diagram showing a typical functional structure of an information processing device 100 in the first embodiment of the present technology.

FIG. 2 is a block diagram showing a typical functional structure of the information processing device 100 in the first embodiment of the present technology. The functional structure (regarding wireless communication) of the information processing devices 200 and 201 is substantially the same as that of the information processing device 100 and thus will not be discussed further.

The information processing device 100 includes a data processing section 110, a communication section 120, an antenna 130, a storage section 140, and a control section 150. Whereas FIG. 2 shows an example in which the information processing device 100 includes one wireless interface portion 122 paired with the antenna 130, the information processing device may include two or more wireless interface portions paired with the antenna each.

The data processing section 110 processes various data under the control of the control section 150. For example, at the time of transmitting data input from an upper layer, the data processing section 110 generates a packet for wireless transmission by performing such processes as adding a header and an error-detecting code to the data. The data processing section 110 supplies the packet thus generated to the communication section 120. At the time of receiving data input from the communication section 120, the data processing section 110 may perform processes such as analyzing the header, detecting any packet error, and reordering packets, and supply the processed data to an upper protocol layer of the data processing section 110.

The communication section 120 includes a signal processing portion 121, a wireless interface portion 122, and a channel estimation portion 123.

The signal processing portion 121 performs various signal-related processes under the control of the control section 150. For example, at the time of transmission, the signal processing portion 121 performs such signal-related processes as encoding, interleaving, modulation, and signal spatial separation if necessary on the data input from the data processing section 110 under a coding and modulating scheme established by the control section 150. The signal processing portion 121 supplies each wireless interface portion 122 with a transmitted symbol stream obtained by the signal processing.

At the time of reception, the signal processing portion 121 may demultiplex as needed a received symbol stream input from the wireless interface portion 122 and reverse the processes performed upon transmission. The signal processing portion 121 supplies the data processing section 110 with the received symbol stream thus processed.

The wireless interface portion 122 is an interface that connects with another information processing device and transmits and receives diverse information thereto and therefrom. For example, at the time of transmitting data input from the signal processing portion 121, the wireless interface portion 122 subjects the data to conversion to an analog signal, amplification, filtering, and frequency up-conversion, before outputting the data to the antenna 130. At the time of reception, the wireless interface portion 122 typically reverses the processes on the data input from the antenna 130, and supplies the result of the processes to the signal processing portion 121 and the channel estimation portion 123.

The channel estimation portion 123 calculates complex channel gain information relating to a propagation path from a preamble part and a training signal part of the input signal from the wireless interface portion 122. The complex channel gain information thus calculated is sent via the control section 150 to the signal processing portion 121 for demodulation and stream demultiplexing.

The storage section 140 serves as a work area for data processing by the control section 150 and functions as a storage medium that holds various data. For example, the storage section 140 may be a storage medium as a nonvolatile memory, a magnetic disk, an optical disk, or a magneto-optical (MO) disk. The nonvolatile memory may be an electrically erasable programmable read-only memory (EEPROM) or an erasable programmable ROM (EPROM). The magnetic disk may be a hard disk or some other suitable disk-like magnetic material disk. The optical disk may be a compact disc (CD), a digital versatile disc recordable (DVD-R), or a Blu-ray Disc (BD) (registered trademark).

The control section 150 controls various receiving and transmitting operations of the data processing section 110 and the communication section 120. For example, the control section 150 transfers information between configured sections, sets communication parameters, and enables the data processing section 110 to schedule packets.

For example, when the information processing device 100 transitions to sleep mode, the control section 150 performs control to transmit a Sleep frame to each slave station. The Sleep frame includes two kinds of information: information for notifying a first device (slave station) compatible with sleep mode that the information processing device 100 will transition to sleep mode, and information for causing a second device (legacy device) incompatible with sleep mode to suppress transmission.

Each slave station (information processing devices 200 and 201) may receive the above-mentioned frame sent by the information processing device 100 notifying that it will transition to sleep mode, for example. In such a case, the own device having received the frame controls its transmission on the basis of the information included in the frame.
(Examples of Communication)

Figure 3:
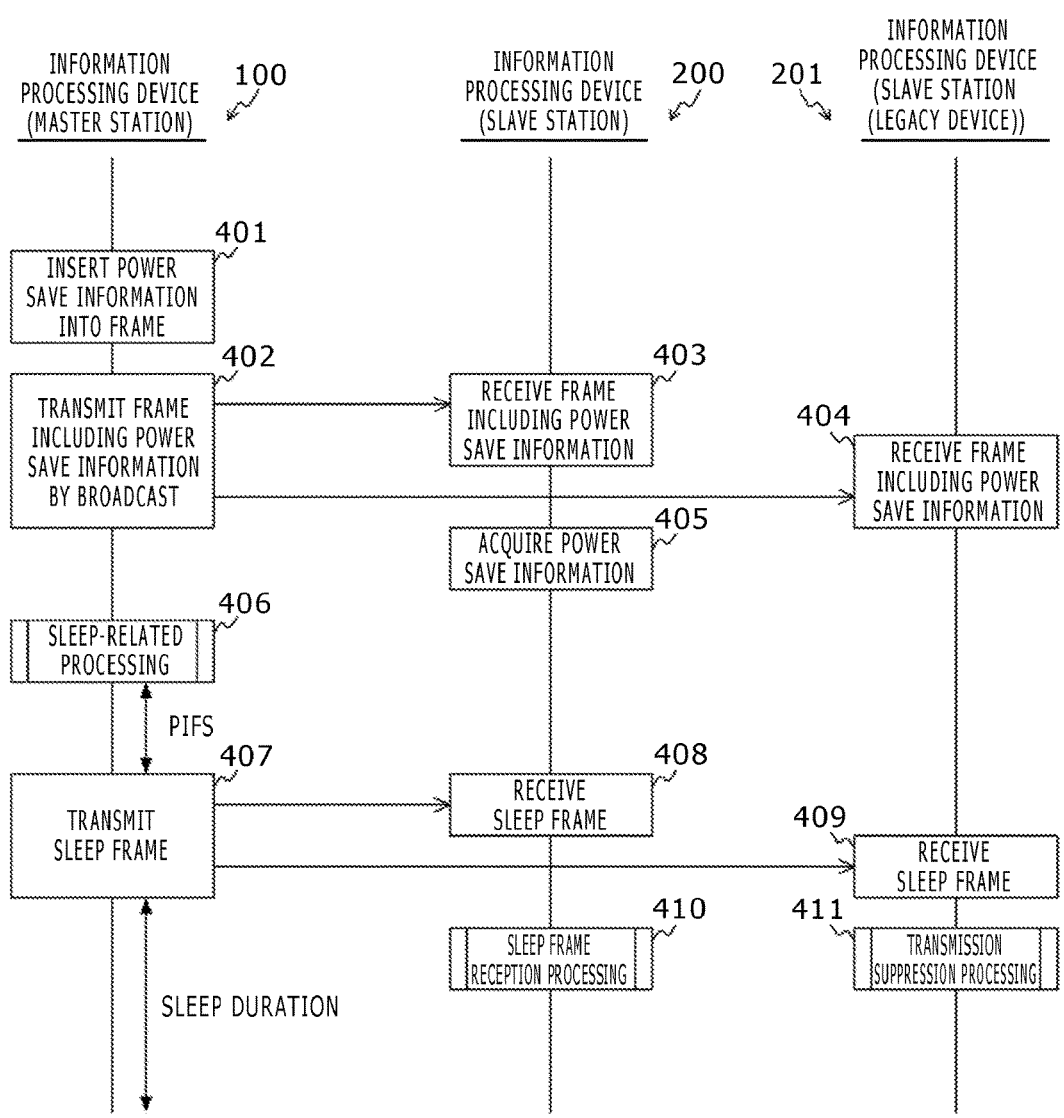
FIG. 3 is a sequence chart showing typical communication processes between devices making up the communication system 10 in the first embodiment of the present technology.

FIG. 3 is a sequence chart showing typical communication processes between the devices making up the communication system 10 in the first embodiment of the present technology.

First, the control section 150 of the information processing device 100 inserts power save information into the frame (401). The control section 150 of the information processing device 100 then transmits by broadcast the frame (broadcast frame) that includes the power save information (402 to 404). For example, a beacon frame may be transmitted as the broadcast frame. The power save information will be discussed later in detail with reference to FIG. 4.

When the control section (equivalent to the control section 150 in FIG. 2) of the information processing device 200 receives the frame including the power save information (403), the control section acquires the power save information included in the received frame (405). The control section of the information processing device 200 then records the acquired power save information (405) to a storage section (equivalent to the storage section 140 shown in FIG. 2).

When the control section (equivalent to the control section 150 in FIG. 2) of the information processing device 201 receives the frame including the power save information (404), the control section performs reception processing regarding the received frame.

After the control section 150 of the information processing device 100 transmits the frame including the power save information (402), the control section 150 performs sleep-related processing (406).

Thereafter, when a scheduled time of Sleep frame transmission included in the transmitted power save information is reached, the control section 150 of the information processing device 100 transmits a Sleep frame to the slave stations (407 to 409). Each of these processes will be discussed later in detail with reference to FIGS. 14 to 16. After transmitting the Sleep frame to the slave stations (407), the control section 150 of the information processing device 100 sets sleep mode.

Upon receipt of the Sleep frame (408), the control section of the information processing device 200 performs Sleep frame reception processing (410). The Sleep frame reception processing will be discussed later in detail with reference to FIGS. 17 and 18.

Upon receipt of the Sleep frame (409), the control section of the information processing device 201 performs transmission suppression processing (411). The transmission suppression processing will be discussed later in detail with reference to FIG. 19.

As described above, the information processing device 200 is a device that can recognize the Sleep frame transmitted from the information processing device 100. Upon receipt of the Sleep frame, the information processing device 200 recognizes that the information processing device 100 has transitioned to sleep mode.

The information processing device 201 is a Sleep frame incompatible device that can receive the Sleep frame but is unable to fully recognize it.

(Example of Power Save Information)

Figure 4:
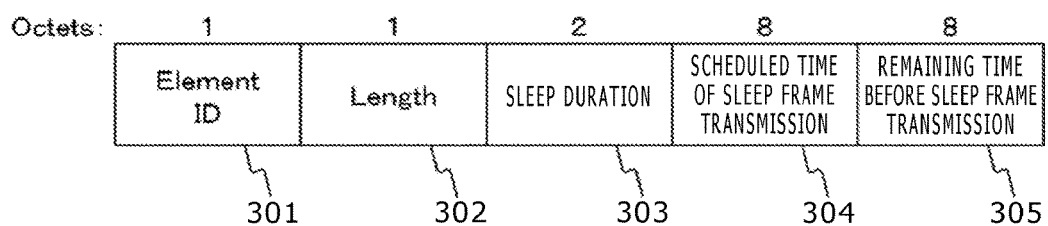
FIG. 4 is a schematic view showing a typical structure of power save information transmitted by the information processing device 100 in the first embodiment of the present technology.

FIG. 4 is a schematic view showing a typical structure of the power save information transmitted by the information processing device 100 in the first embodiment of the present technology.

The power save information is typically made up of an element identifier (ID) 301, a length 302, a sleep duration 303, a scheduled time of Sleep frame transmission 304, and a remaining time before Sleep frame transmission 305. In FIG. 4, the fields accommodating the information items are each topped by a value in octets. Likewise, the fields (or some of them) in some of the subsequent drawings will be each topped by a value in octets.

FIG. 4 illustrates the power save information that includes the sleep duration 300, the scheduled time of Sleep frame transmission 304, and the remaining time before Sleep frame transmission 305. Alternatively, power save information may be used which includes at least one of the items that are the sleep duration 303, the scheduled time of Sleep frame transmission 304, and the remaining time before Sleep frame transmission 305. One or multiple items of the information are stored in a power save information element when transmitted. For example, the information items are stored in a beacon frame when transmitted.

The scheduled time of Sleep frame transmission 304 may include information that uniquely determines a certain point in time, a cyclical time relative to a given point in time, or both.

In the manner described above, before transmitting the Sleep frame, the control section 150 of the information processing device 100 notifies each slave station of the scheduled time of Sleep frame transmission. In this case, the control section 150 may transmit the scheduled time using a broadcast frame.

(Typical Frame Formats of the Sleep Frame)

The Sleep frame is a frame for notifying the slave stations except legacy devices of the duration in which the master station will transition to sleep mode while causing the legacy devices to suppress transmission as long as the master station is in sleep mode. This requires a frame format that not only the slave stations except legacy devices fully interpret but also the legacy devices enable to interpret the Sleep frame to a certain extent. Such a Sleep frame may come in diverse forms. Some typical Sleep frame formats are described below.

(Example of using the HE PPDU Format Frame)

FIG. 5 is a schematic view showing a typical structure of the Sleep frame transmitted by the information processing device 100 in the first embodiment of the present technology. FIG. 5 shows an example of using a high frequency (HE) physical layer convergence procedure (PLCP) protocol data unit (PPDU) format frame as the Sleep frame.

Figure 6:
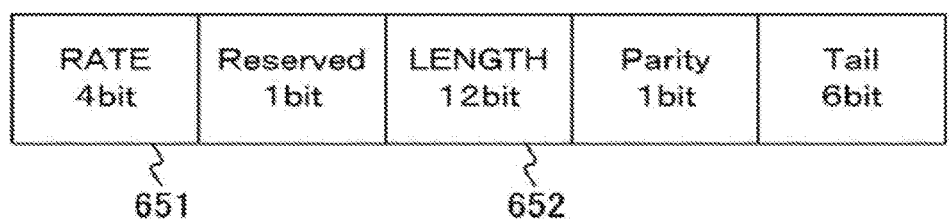
FIG. 6 is a schematic view showing a typical structure of a legacy signal field (L-SIG) included in the Sleep frame transmitted by the information processing device 100 in the first embodiment of the present technology.

FIG. 6 is a schematic view showing a typical structure of an L-SIG included in the Sleep frame transmitted by the information processing device 100 in the first embodiment of the present technology. The L-SIG in FIG. 6 corresponds to an L-SIG 313 shown in FIG. 5, for example.

The HE PPDU format frame is fully interpreted only by the slave stations except legacy devices (i.e., by the information processing device 200). In this frame, only a legacy short training field (L-STF) 311 through the L-SIG 313 are interpreted by the legacy devices (i.e., by the information processing device 201).

In the first embodiment of the present technology, a legacy data rate (L_DATARATE) value and a legacy length (L_LENGTH) value are set in the L-SIG 313. That is, the L_DATARATE value is set in a RATE field 651 and the L_LENGTH value in a LENGTH field 652, as shown in FIG. 6. In this manner, by use of the L_DATARATE and L_LENGTH values in the L_SIG 313, the master station (information processing device 100) can notify the slave stations of the duration in which the master station (information processing device 100) will transition to sleep mode. For example, the L_DATARATE and L_LENGTH values to be included in the frame are such as to permit the calculation of the duration in which the master station (information processing device 100) will transition to sleep mode by use of the following equation 1:

$$\text{Sleep Duration} = (L\_LENGTH/L\_DATARATE) \quad \text{Equation 1}$$

Under IEEE 802.11, a wireless device that has received a frame cannot transmit anything while performing calculations on the basis of the L_DATARATE and L_LENGTH values. For example, the legacy device (information processing device 201) that has received the HE PPDU format frame cannot interpret the frame as the Sleep frame. However, the legacy device (information processing device 201) having received the frame may set transmission suppression in such a manner that transmission will not take place for the duration calculated on the basis of the L_DATARATE and L_LENGTH values.

The master station (information processing device 100) inserts the identifier of the Sleep frame into a Frame Control field 318 in the MAC header. Thus the identifier enables the slave station (information processing device 200) capable of fully interpreting the HE PPDU frame to recognize that the received frame is the Sleep frame.

The master station (information processing device 100) may also insert into a Duration field 319 the sleep duration in which the master station (information processing device 100) will transition to sleep mode.

(Example of using the Management Frame)

A Management frame format may be used as the Sleep frame. In this case, the master station (information processing device 100) transmits the Management frame using a legacy PPDU format. This enables not only the slave stations except legacy devices (i.e., information processing device 200) but also the legacy devices (information processing device 201) to fully interpret the frame.

Figure 7:
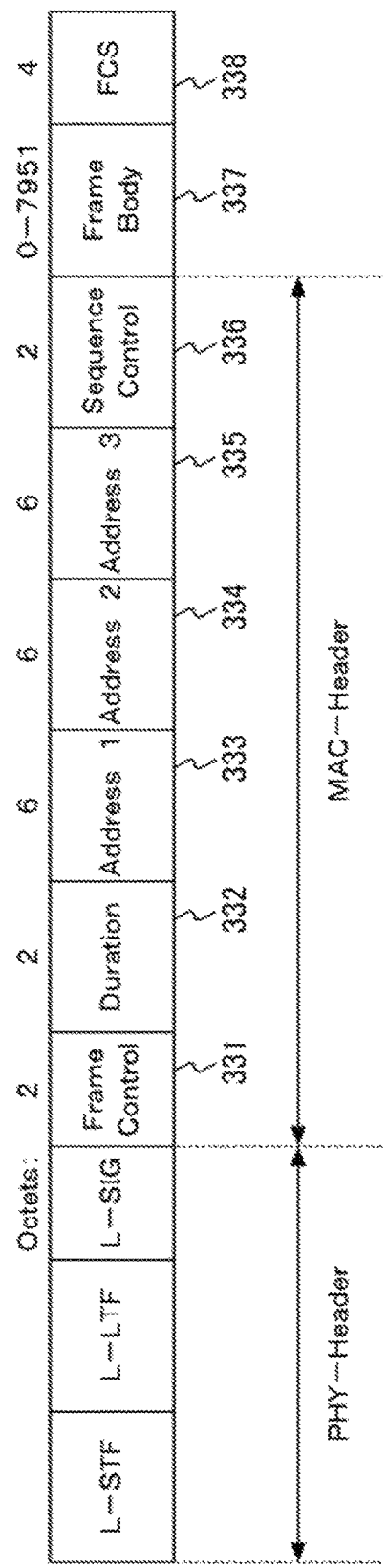
FIG. 7 is a schematic view showing another typical structure of the Sleep frame transmitted by the information processing device 100 in the first embodiment of the present technology.

FIG. 7 is a schematic view showing another typical structure of the Sleep frame transmitted by the information processing device 100 in the first embodiment of the present technology. FIG. 7 shows an example in which the Management frame is used as the Sleep frame.

Generally, a destination address is set in an Address 1 field (333), a source address is set in an Address 2 field (334), and the address of the master station (information processing device 100) with which the own device is connected is set in an Address 3 field (335).

In the first embodiment of the present technology, however, the address of the own device (i.e., master station address) is inserted into all of the Address 1 field (333), the Address 2 field (334), and the Address 3 field (335) of the Management frame. This enables the slave stations except legacy devices (information processing device 200) to recognize that the Management frame is the Sleep frame.

The legacy devices (information processing device 201) not cognizant of that rule cannot determine whether or not the Management frame is the Sleep frame.

Alternatively, the master station (information processing device 100) may insert the Sleep frame identifier into a Frame Body field 337 instead of using the Address 1 field (333), the Address 2 field (334), and the Address 3 field (335) for notification purposes.

In the first embodiment of the present technology, the duration in which the master station (information processing device 100) will transition to sleep mode is set in a Duration field 332 in the Management frame. Because the duration value (Duration field 332) in this case is a value placed in the MAC header, backward compatibility is guaranteed. This enables the legacy devices not cognizant of the Sleep frame to interpret the Duration field 332.

Also under IEEE 802.11, a wireless device that has received a frame cannot transmit anything for the duration whose value is set in the Duration value (Duration field 332) of the frame. Thus the legacy device having received the Management frame can be set to suppress transmission only for the duration placed in the Duration field 332 without having to interpret the frame as the Sleep frame.

(Example of Setting the Sleep Frame Identifier in the MAC Header)

Described below is an example in which the Sleep frame identifier is set in the MAC header.

Figure 8:
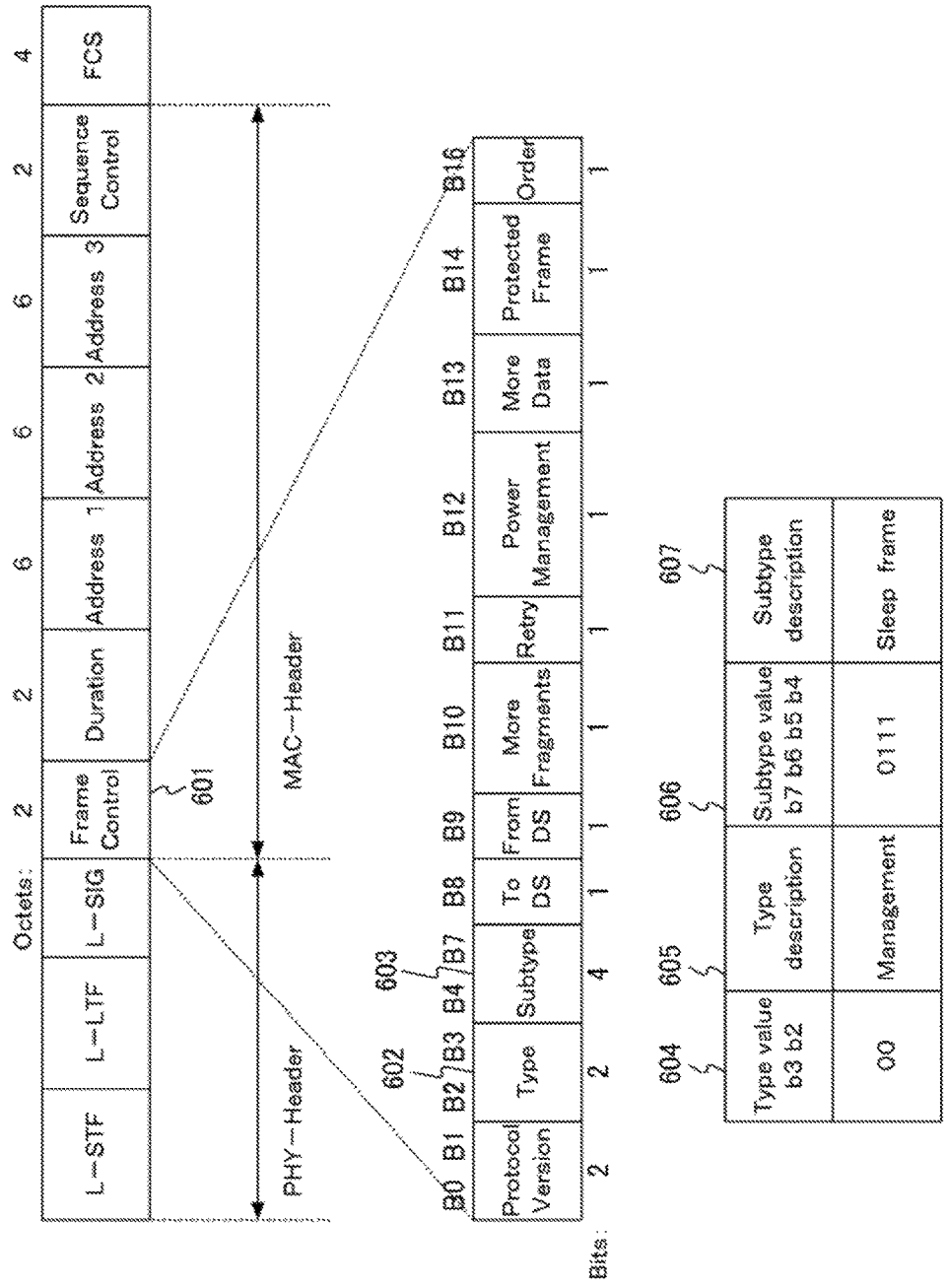
FIG. 8 is a schematic view showing another typical structure of the Sleep frame transmitted by the information processing device 100 in the first embodiment of the present technology.
Figure 9:
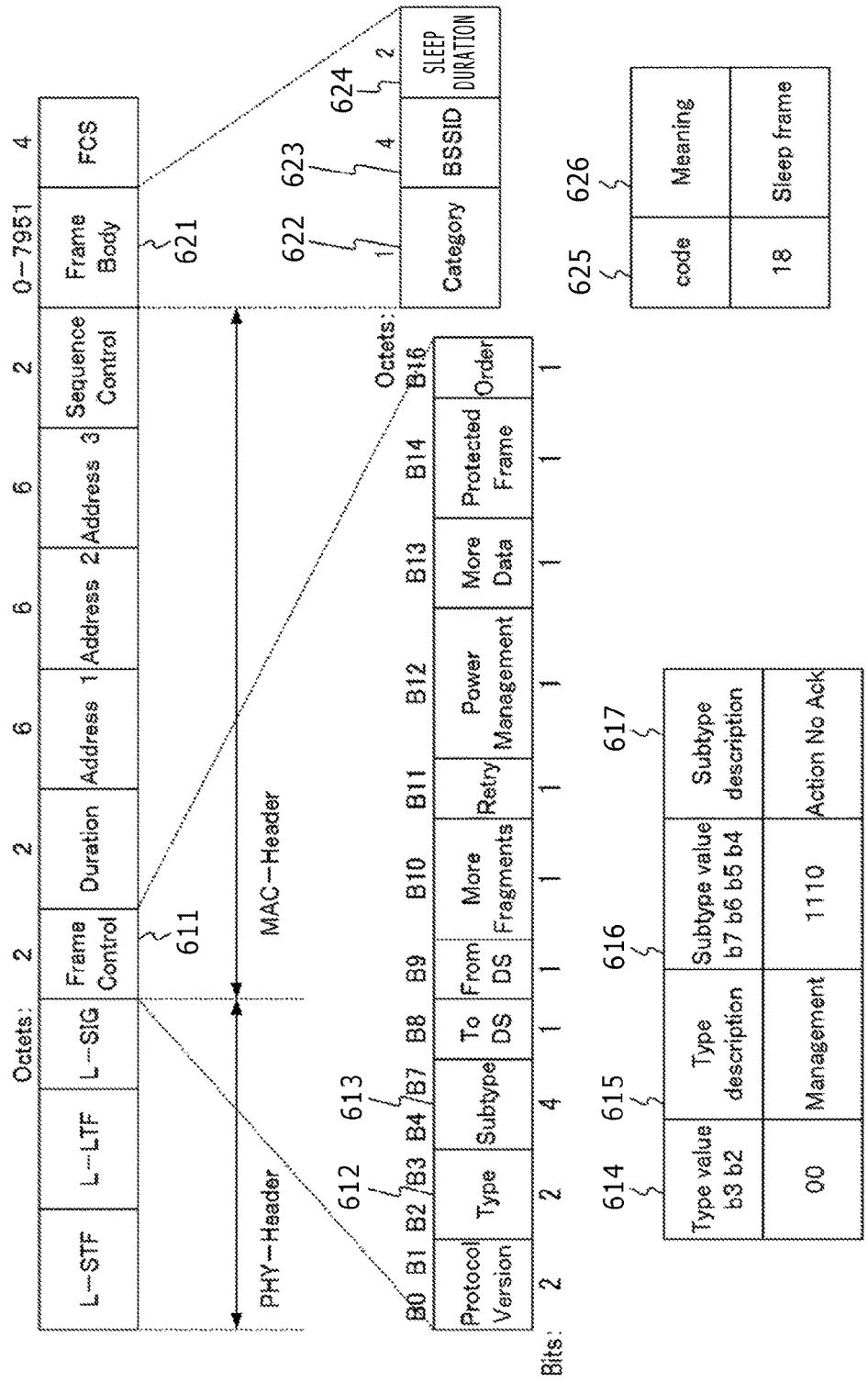
FIG. 9 is a schematic view showing another typical structure of the Sleep frame transmitted by the information processing device 100 in the first embodiment of the present technology.

FIGS. 8 and 9 are schematic views showing other typical structures of the Sleep frame transmitted by the information processing device 100 in the first embodiment of the present technology. FIG. 8 shows an example in which the Sleep frame identifier is set in a Frame Control field for transmission using the Management frame. FIG. 9 shows an example in which the Sleep frame identifier is set in a Frame Body field for transmission using the Management frame. That is, FIG. 8 gives an example in which the Frame Body field is not provided, and FIG. 9 gives an example in which a Frame Body field 621 is disposed.

As shown in FIGS. 8 and 9, the identifier indicative of the Management frame is set in Type fields 602 and 612 in Frame Control fields 601 and 611, respectively. The identifier (bit value) and its meanings are shown in Tables 604, 605, 614, and 615.

As shown in FIG. 8, when the Sleep frame identifier is set in the Frame Control field, the identifier indicative of the Management frame is placed into a Subtype field 603. The identifier (bit value) and its meanings are shown in Tables 606 and 607.

As shown in FIG. 9, when the Sleep frame identifier is set in the Frame Body field, the identifier indicative of an Action no Acknowledge (Ack) frame is placed into a Subtype field 613. The identifier (bit value) and its meanings are shown in Tables 616 and 617. The identifier indicative of the Sleep frame is set in a Category field 622 in the Frame Body field 621. The identifier (code) and its meanings are shown in Tables 625 and 626. The master station identifier is set in a basic service set identifier (BSSID) field 623, and information relating to the sleep duration is placed in a Sleep Duration field 624.

(Example of using the Control Frame)

A Control frame may alternatively be used as the Sleep frame. In this case, the master station (information processing device 100) transmits the Control frame using the legacy PPDU format. This enables not only the slave stations except legacy devices (information processing device 200) but also the legacy devices (information processing device 201) to fully interpret the frame.

Figure 10:
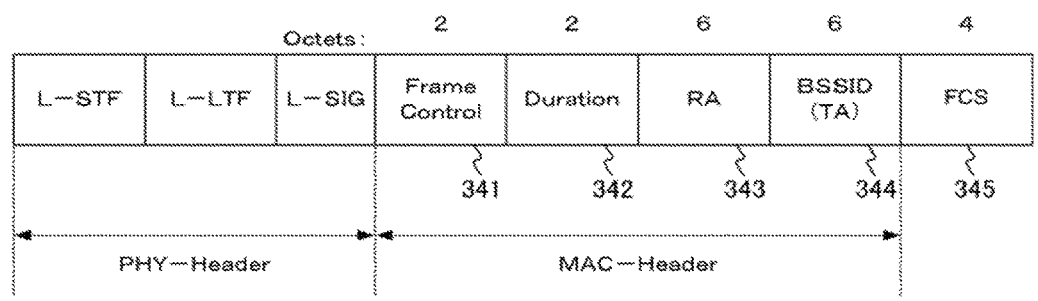
FIG. 10 is a schematic view showing another typical structure of the Sleep frame transmitted by the information processing device 100 in the first embodiment of the present technology.

FIG. 10 is a schematic view showing another typical structure of the Sleep frame transmitted by the information processing device 100 in the first embodiment of the present technology. FIG. 10 shows an example in which the Control frame is used as the Sleep frame.

In the first embodiment of the present technology, the address of the master station (information processing device 100) is set in both a return address (RA) field 343 and a BSSID transmitting station address (TA) field 344.

The duration in which the master station (information processing device 100) will transition to sleep mode is set in a Duration field 342.

Alternatively, the master station (information processing device 100) may set the Sleep frame identifier in a Frame Control field 341 in the Control frame. This enables the slave stations capable of fully interpreting the Control frame to determine that this frame is the Sleep frame.

(Example of Setting the Sleep Frame Identifier in the MAC Header)

Described below is an example in which the Sleep frame identifier is set in the MAC header.

Figure 11:
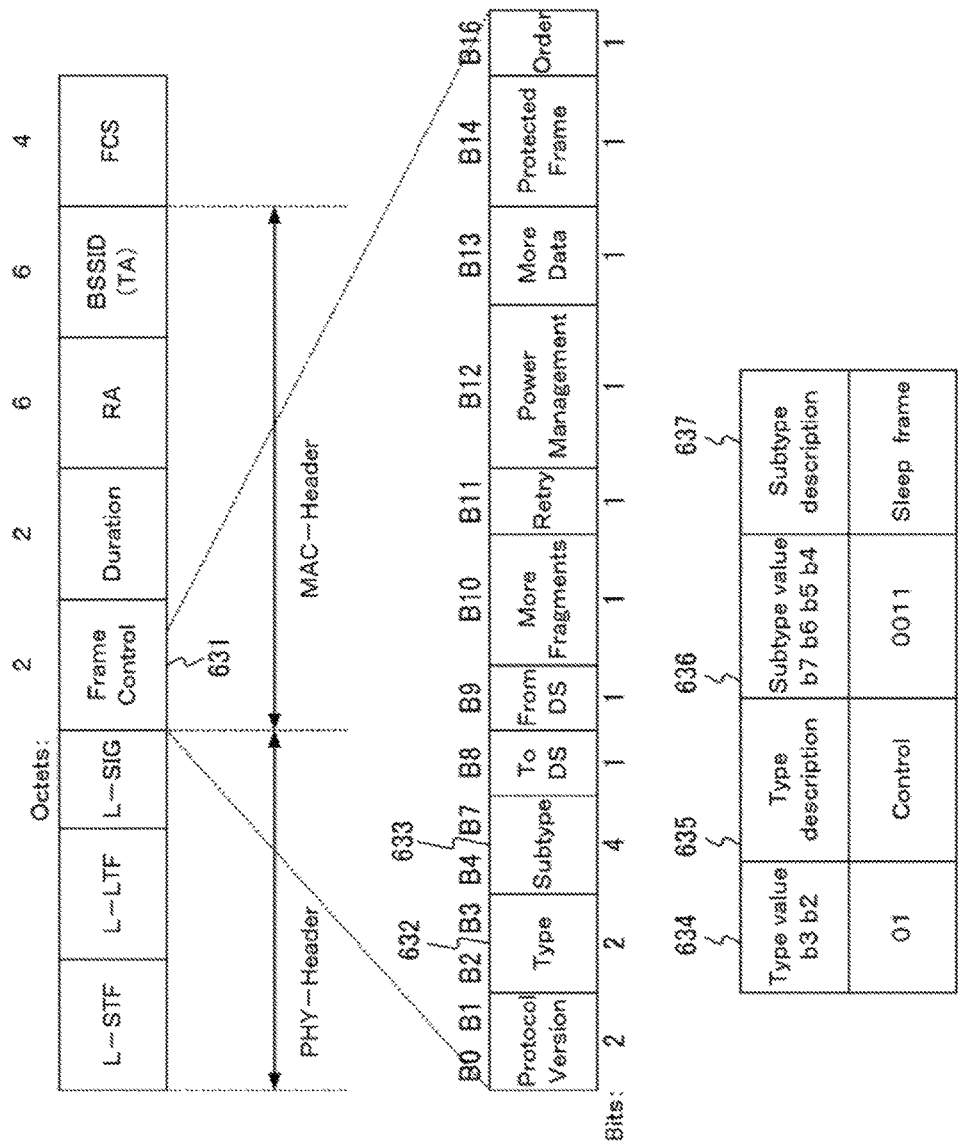
FIG. 11 is a schematic view showing another typical structure of the Sleep frame transmitted by the information processing device 100 in the first embodiment of the present technology.

FIG. 11 is a schematic view showing another typical structure of the Sleep frame transmitted by the information processing device 100 in the first embodiment of the present technology. FIG. 11 shows an example in which the Sleep frame identifier is set in a Frame Control field for transmission using the Control frame.

As shown in FIG. 11, the identifier indicative of the Control frame is set in a Type field 632 in a Frame Control field 632. This identifier (bit value) and its meanings are shown in Tables 634 and 635. The identifier indicative of the Sleep frame is set in a Subtype field 633. This identifier (bit value) and its meanings are shown in Tables 636 and 637.

FIGS. 8, 9, and 11 have shown examples in which the Management frame or the Control frame is used as the Sleep frame. This scheme can also be applied to the case where the HE PPDU format frame (shown in FIG. 5) is used.

(Example of using a Null Data Packet (NDP) Frame)

An NDP frame may also be used as the Sleep frame. In this case, the NDP frame is a frame that has only the PHY header and is devoid of a payload.

Figure 12:
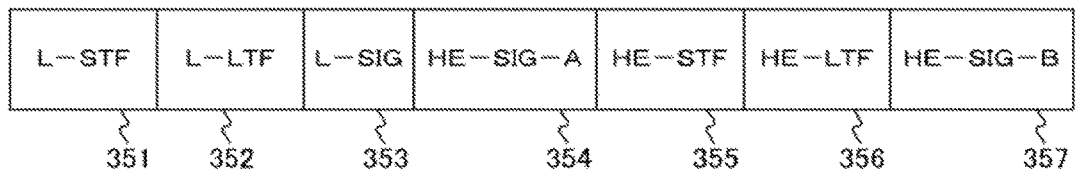
FIG. 12 is a schematic view showing another typical structure of the Sleep frame transmitted by the information processing device 100 in the first embodiment of the present technology.

FIG. 12 is a schematic view showing another typical structure of the Sleep frame transmitted by the information processing device 100 in the first embodiment of the present technology. FIG. 12 shows an example in which the NDP frame is used as the Sleep frame.

An L-SIG 353 is a field that guarantees backward compatibility. That means the L-SIG 353 holds information that can be interpreted by both the slave stations except legacy devices (i.e., information processing device 200) and the legacy devices (information processing device 201). In the first embodiment of the present technology, the L_LENGTH and L_DATARATE values are set in the L-SIG 353. The structure of the L-SIG 353 is the same as that shown in FIG. 6.

A high-efficiency signal field A (HE-SIG-A) 354 through a high-efficiency signal field B (HE-SIG-B) 357 hold information that can only be interpreted by the slave stations except legacy devices (i.e., by the information processing device 200).

In the first embodiment of the present technology, the identifier of the master station (information processing device 100) is set in at least either the HE-SIG-A 354 or the HE-SIG-B 357. This allows any other wireless device disconnected from the master station (information processing device 100) to ignore the NDP frame.

Also in the first embodiment of the present technology, the identifier indicating that the NDP frame is the Sleep frame (i.e., Sleep frame identifier) is set in at least either the HE-SIG-A 354 or the HE-SIG-B 357. This enables the slave stations except legacy devices (information processing device 200) to recognize that the NDP frame is the Sleep frame.

The legacy devices (e.g., information processing device 201) incapable of interpreting the HE-SIG-A 354 and subsequent fields cannot determine whether or not the NDP frame is the Sleep frame.

(Example of Setting the Sleep Frame Identifier in the PHY Header)

Described below is an example in which the Sleep frame identifier is set in the PHY header.

Figure 13:
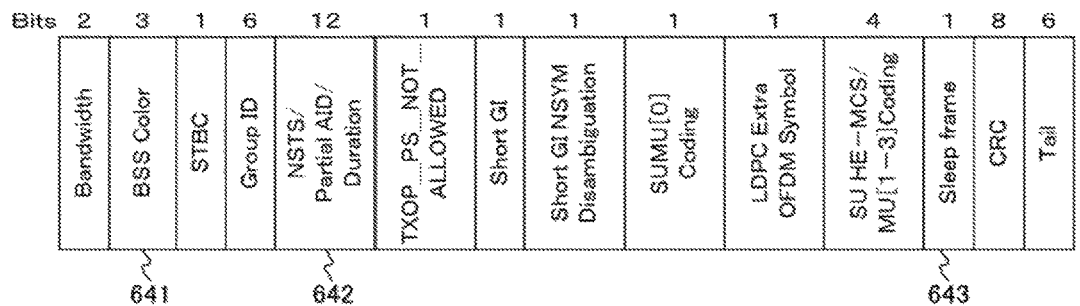
FIG. 13 is a schematic view showing another typical structure of the Sleep frame transmitted by the information processing device 100 in the first embodiment of the present technology.

FIG. 13 is a schematic view showing another typical structure of the Sleep frame transmitted by the information processing device 100 in the first embodiment of the present technology. FIG. 13 shows an example in which the Sleep frame identifier is set in a HE-SIG field.

Figure 24:
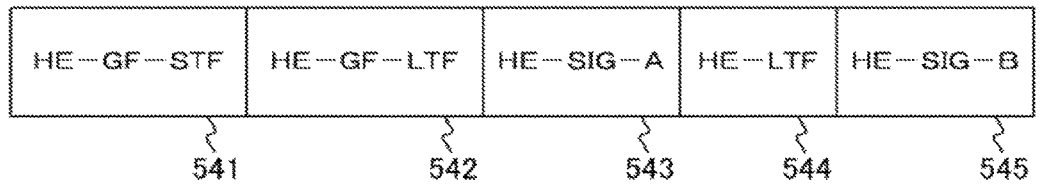
FIG. 24 is a schematic view showing another typical structure of the second Sleep frame transmitted by the information processing device 100 in the second embodiment of the present technology.

As shown in FIG. 13, the identifier indicative of the Sleep frame is set in a Sleep Frame field 643. The master station identifier is set in a basic service set (BSS) Color field 641. Either a field 642 is used to hold the duration value, or this field is omitted. For example, if the NDP frame shown in FIG. 24 is used, then the field 642 is used to hold the duration value.

(Typical Operations of Sleep-Related Processing (Master Station))

Figure 14:
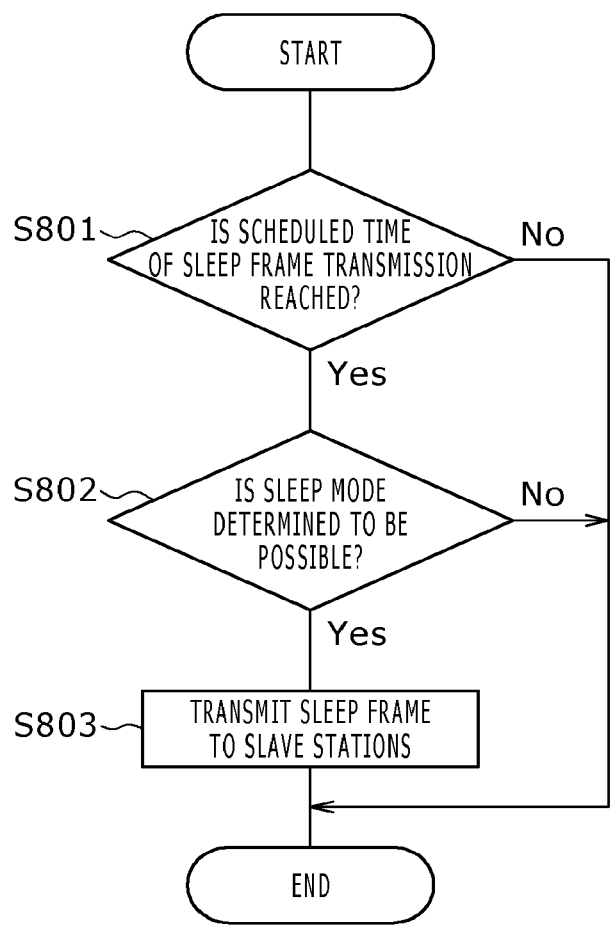
FIG. 14 is a flowchart showing a typical procedure for sleep-related processing performed by the information processing device 100 in the first embodiment of the present technology.
Figure 15:
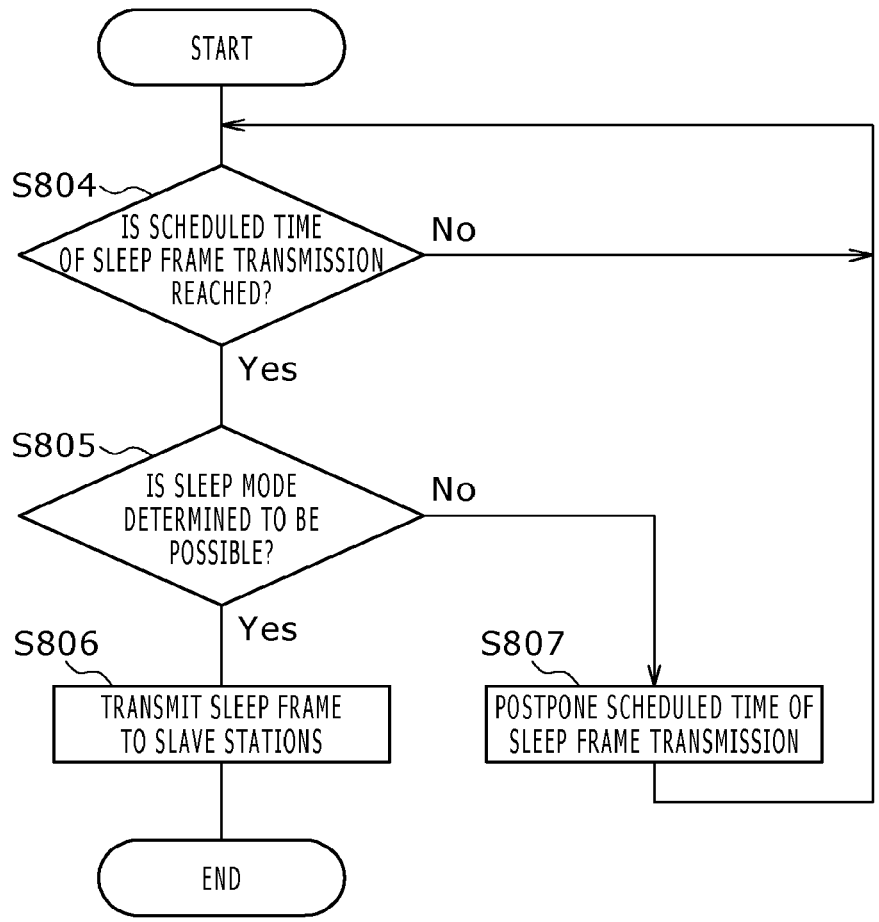
FIG. 15 is a flowchart showing another typical procedure for the sleep-related processing performed by the information processing device 100 in the first embodiment of the present technology.
Figure 16:
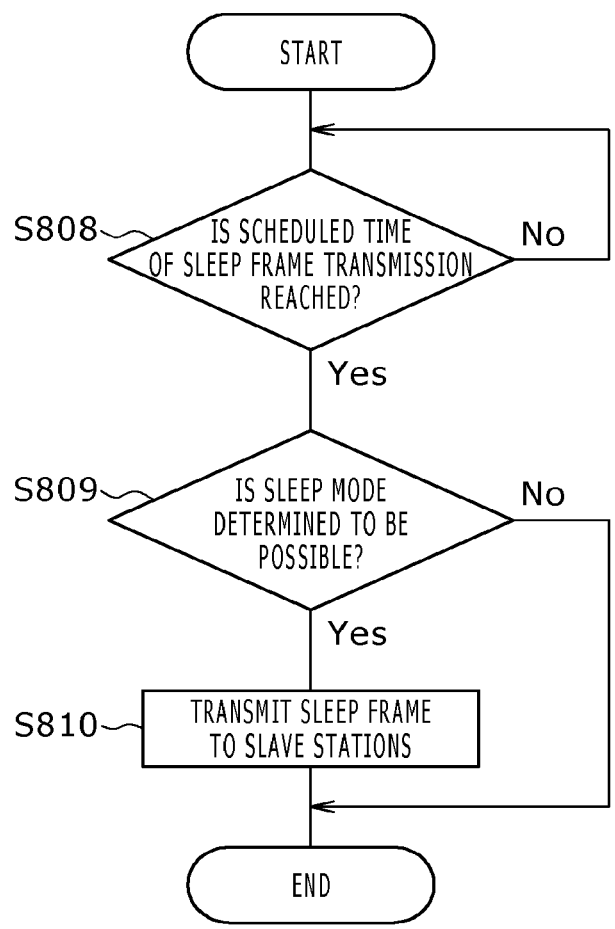
FIG. 16 is a flowchart showing another typical procedure for the sleep-related processing performed by the information processing device 100 in the first embodiment of the present technology.

FIGS. 14 to 16 are flowcharts showing typical procedures for sleep-related processing performed by the information processing device 100 in the first embodiment of the present technology. The processes shown in FIGS. 14 to 16 correspond to the processes (406 and 407) indicated in FIG. 3. The processing is described below, first with reference to FIG. 14.

The control section 150 of the information processing device 100 first determines whether or not the scheduled time of Sleep frame transmission (i.e., previously announced sleep duration) is reached on the basis of the power save information included in the frame transmitted by broadcast (step S801). If the scheduled time of Sleep frame transmission has yet to be reached (step S801), the operation of the sleep-related processing is terminated.

If it is determined that the scheduled time of Sleep frame transmission is reached (step S801), the control section 150 of the information processing device 100 determines whether or not sleep mode is possible (step S802). The rules for determining whether or not sleep mode is possible are explained below.

For example, if a More Data bit in the data frame transmitted to the own device is 0, that means the slave station having sent the data frame has no intention of transmitting any more data. Thus one determining rule may be based on whether the More Data bit is 0 in the data frame transmitted to the own device. For example, if the More Data bit is 0 in the data frame transmitted to the own device, sleep mode is determined to be possible. If the More Data bit is 1 in the data frame transmitted to the own device, then sleep mode is determined to be impossible.

Another determining rule may be based on the number of frames transmitted to the own device from a reference time until the present time. The reference time may typically be the time at which the own device last transmitted a beacon. For example, if the number of frames transmitted to the own device from the reference tile until the present time is smaller than a threshold value (e.g., if the frame count is less than the threshold value), sleep mode is determined to be possible. On the other hand, if the number of frames transmitted to the own device from the reference time until the present time is larger than the threshold value (e.g., if the frame count is equal to or more than the threshold value), then sleep mode is determined to be impossible.

Still another determining rule may be based on the number of frames transmitted to the slave stations connected with the own device from the reference time until the present time. For example, if the number of frames transmitted to the slave stations connected with the own device from the reference time until the present time is smaller than a threshold value (e.g., if the frame count is less than the threshold value), sleep mode is determined to be possible. On the other hand, if the number of frames transmitted to the slave stations connected with the own device from the reference time until the present time is larger than the threshold value (e.g., if the frame count is equal to or more than the threshold value), then sleep mode is determined to be impossible.

Still another determining rule may be based on the remaining time before transition to sleep mode. For example, if the remaining time before transition to sleep mode is longer than a threshold value (e.g., if the remaining time value is equal to or larger than the threshold value), sleep mode is determined to be possible. If the remaining time before transition to sleep mode is shorter than the threshold value (e.g., if the remaining time value is less than the threshold value), then sleep mode is determined to be impossible. As another alternative, if the remaining time before transition to sleep mode is shorter than the threshold value (e.g., if the remaining time value is less than the threshold value), sleep mode may be determined to be possible. In this case, if the remaining time before transition to sleep mode is longer than the threshold value (e.g., if the remaining time value is equal to or larger than the threshold value), then sleep mode is determined to be impossible.

If sleep mode is determined to be possible (step S802), the control section 150 of the information processing device 100 transmits the Sleep frame to the slave stations (step S803). Incidentally, step S803 is an example of the transmitting procedure stated in the appended claims. On the other hand, if sleep mode is determined to be impossible (step S802), the operation of the sleep-related processing is terminated.

FIG. 15 shows typical operations for postponing the time to transmit the Sleep frame. FIG. 16 shows typical operations for stopping the transmission of the Sleep frame.

For example, as shown in FIG. 14, the information processing device 100 may stop entering sleep mode upon determining whether or not sleep mode is possible. When performing the sleep-related processing recursively, the information processing device 100 can receive data from the slave stations by postponing the scheduled time of Sleep frame transmission. In this case, after receiving the frame from a slave station, the information processing device 100 can start sleep mode. As described, sleep mode can be entered in an adaptive manner.

If it is determined that sleep mode is impossible (step S805) as shown in FIG. 15, the scheduled time of Sleep frame transmission may be postponed (step S807). Also, if it is determined that sleep mode is impossible (step S809) as shown in FIG. 16, the transmission of the Sleep frame may be stopped (step S810). Such decisions to postpone or stop Sleep frame transmission may be taken in accordance with suitable determining rules. The rules for determining whether to postpone or stop Sleep frame transmission may be the same as the determining rules applied in step S802, for example.

As described above, the control section 150 of the information processing device 100 can transmit the Sleep frame by postponing the scheduled time of Sleep frame transmission on the basis of suitable determining rules. For example, the control section 150 may base the determining rule on the information relating to the frame transmitted to the information processing device 100 (e.g., information as to whether or not there is any frame transmitted to the information processing device 100).

The control section 150 may stop Sleep frame transmission on the basis of suitable determining rules. For example, the control section 150 may base the determining rule on the receipt from an upper layer of any data destined for another information processing device connected with the information processing device 100 before the scheduled time of Sleep frame transmission is reached. As another example, the control section 150 may base the determining rule on the receipt of another frame destined for the information processing device 100 before the scheduled time of Sleep frame transmission is reached.

The control section 150 inserts into the Sleep frame an identifier identifying the information processing device 100 and duration information for specifying the duration in which the information processing device 100 will transition to sleep mode, before transmitting the Sleep frame. In this case, the control section 150 can insert the identifier and the duration information into at least either the PHY header or the MAC header in the Sleep frame, before transmitting the Sleep frame.

The control section 150 may set the destination of the Sleep frame for the information processing device 100. The control section 150 may also set, as a waiting duration before Sleep frame transmission, a duration guaranteed to be shorter than the duration in which each of the slave stations waits for transmission.

If it is determined that sleep mode is possible, the control section 150 of the information processing device 100 may set the waiting duration before Sleep frame transmission for a value smaller than the waiting duration in which any slave station is required to wait before transmitting the frame. For example, as shown in FIG. 3, the control section 150 of the information processing device 100 may set a point coordination function (PCF) inter frame spacing (PIFS) as the waiting duration required before Sleep frame transmission.

(Typical Operations of Sleep Frame Reception Processing (Slave Stations))

Figure 17:
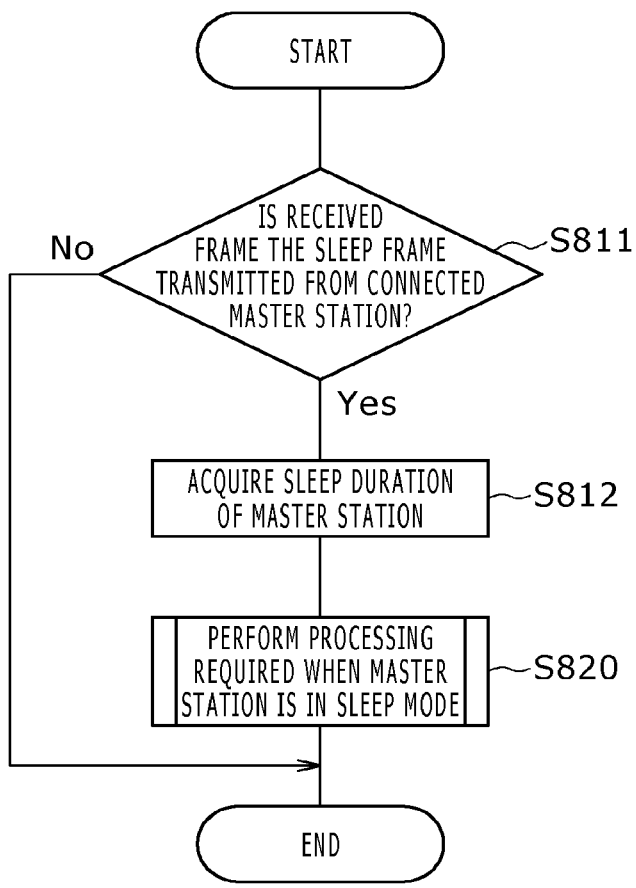
FIG. 17 is a flowchart showing a typical procedure for processing of Sleep frame reception performed by an information processing device 200 in the first embodiment of the present technology.

FIG. 17 is a flowchart showing a typical procedure for the processing of Sleep frame reception performed by the information processing device 200 in the first embodiment of the present technology.

First, based on the content of the received frame, the control section (equivalent to the control section 150 shown in FIG. 2) of the information processing device 200 determines whether or not the frame is a Sleep frame transmitted from the connected master station (step S811). That is, the control section of the information processing device 200 determines whether or not the received frame is the Sleep frame and the frame is destined for the own device (step S811).

For example, if the HE PPDU format frame shown in FIG. 5 is used as the Sleep frame, the Sleep frame identifier is set in the Frame Control field 318. Thus upon receipt of the Sleep frame identifier placed in the Frame Control field 318, the control section of the information processing device 200 may determine whether or not the received frame is the Sleep frame. Also, the control section of the information processing device 200 may acquire a transmission destination address set in an Address 1 field (320) of the MAC header to determine whether or not the received frame is the frame which has been transmitted from the connected master station.

As another example, if the Management frame shown in FIG. 7 is used as the Sleep frame, the address of the master station is set in all of the Address 1 field (333) through the Address 3 field (335). The control section of the information processing device 200 may then determine whether the Address 1 (destination address) coincides with the Address 2 (source address) to determine whether or not the received frame is the Sleep frame. Whereas this example compares two addresses (i.e., Address 1 (destination address) and Address 2 (source address)), three addresses may alternatively be compared for the determination. Also, the control section of the information processing device 200 may acquire the destination address set in the Address 1 field (333) to determine whether or not the received frame has been transmitted from the connected master station.

As still another example, if the Control frame shown in FIG. 10 is used as the Sleep frame, the address of the master station is set in the RA field 343 and the BSSID (TA) field 344. Thus the control section of the information processing device 200 may determine whether the content of the RA field 343 coincides with that of the BSSID (TA) field 344 to determine whether or not the received frame is the Sleep frame. Also, the control section of the information processing device 200 may acquire the master station address set in the RA field 343 and the BSSID (TA) field 344 to determine whether or not the received frame is the frame which has been transmitted from the connected master station.

As still another example, if the NDP frame shown in FIG. 12 is used as the Sleep frame, the Sleep frame identifier is set at least in either the HE-SIG-A 354 or the HE-SIG-B 357. Thus the control section of the information processing device 200 may acquire the Sleep frame identifier set in the HE-SIG-A 354 or in the HE-SIG-B 357 to determine whether or not the received frame is the Sleep frame. Also, the control section of the information processing device 200 may acquire the master station address set in the HE-SIG-A 354 or in the HE-SIG-B 357 to determine whether or not the received frame is the frame which has been transmitted from the connected master station.

As still another example, if a Sleep frame whose identifier is set in the MAC header as shown in FIG. 8 is used, the information placed in the Subtype field 603 may be used for the determination.

As still another example, if a Sleep frame whose identifier is set in the Frame Body field as shown in FIG. 9 is used, the information placed in the Category field 622 may be used for the determination. In this case, the master station identifier placed in the BSSID field 623 may be used.

As still another example, if a Sleep frame whose identifier is set in the MAC header as shown in FIG. 11 is used, the information placed in the Subtype field 633 may be used for the determination.

As still another example, if a Sleep frame whose identifier is set in the PHY header as shown in FIG. 13 is used, the information placed in the Sleep Frame field 643 may be used for the determination. In this case, the master station identifier set in the BSS Color field 641 may be used.

The information used for the determination as described above is only examples. Other items of information set in the received frame may alternatively be used for the determination.

If the received frame is not the Sleep frame transmitted from the connected master station (step S811), the control section of the information processing device 200 discards the received frame, cancels transmission suppression, and returns to normal processing. That is, if the received frame is the Sleep frame but not destined for the own device (step S811), the received frame is discarded, transmission suppression is canceled, and control is returned to normal processing. If the received frame is not the Sleep frame but is destined for the own device (step S811), the control section performs processing regarding the received frame and returns to normal processing.

If the received frame is the Sleep frame transmitted from the connected master station (step S811), the control section of the information processing device 200 acquires (step S812) the duration in which the master station will transition to sleep mode (i.e., sleep duration of the master station).

For example, suppose that the HE PPDU format frame shown in FIG. 5 or the NDP frame shown in FIG. 12 is used as the Sleep frame. In such a case, the control section of the information processing device 200 acquires the L_DATARATE and L_LENGTH values from the L-SIG 313 or 353 (RATE field 651 and LENGTH field 652 shown in FIG. 6). The control section of the information processing device 200 then acquires the duration calculated by use of the above-mentioned equation 1 as the duration in which the master station will transition to sleep mode.

As another example, suppose that the Management frame shown in FIG. 7 or the Control frame shown in FIG. 10 is used as the Sleep frame. In such a case, the duration in which the master station will transition to sleep mode is set in the Duration field 332 or 342. The control section of the information processing device 200 may then acquire from the Duration field 332 or 342 the duration in which the master station will transition to sleep mode.

The above-described methods for acquiring the duration are only examples. Alternatively, other information placed in the received frame may be used to acquire the duration in which the master station will transition to sleep mode.

Thereafter, the control section of the information processing device 200 performs the processing applied when the master station is in sleep mode (step S820). The processing will be discussed later in detail with reference to FIG. 18.

(Typical Operations of the Processing Performed when the Master Station is in Sleep Mode (Slave Stations))

Figure 18:
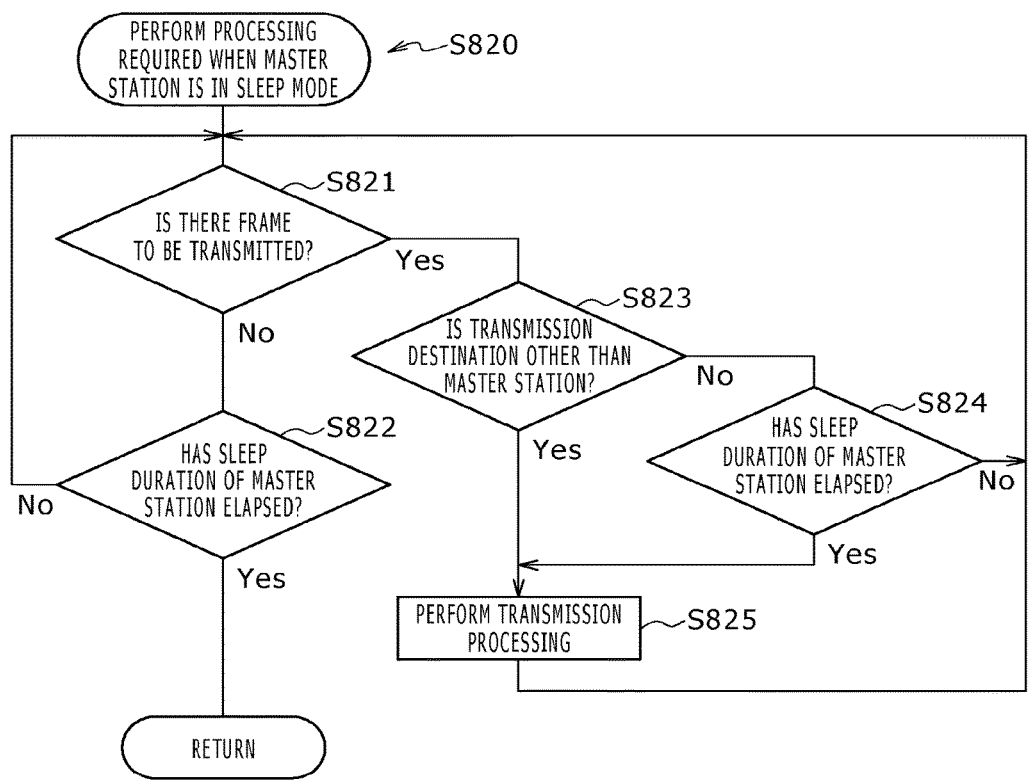
FIG. 18 is a flowchart showing a typical procedure for processing performed by the information processing device 200 in the first embodiment of the present technology when the master station is in sleep mode.

FIG. 18 is a flowchart showing a typical procedure for processing performed by the information processing device 200 in the first embodiment of the present technology when the master station is in sleep mode (i.e., the procedure for the processing in step S820 of FIG. 17).

First, the control section of the information processing device 200 determines whether or not there is any frame to be transmitted by the own device (step S821). If there is no frame to be transmitted by the own device (step S821), the control section of the information processing device 200 determines whether or not the sleep duration of the master station has elapsed (step S822). If the sleep duration of the master station has yet to elapse (step S822), control is returned to step S821. In this manner, the information processing device 200 remains in sleep mode until the sleep duration of the master station comes to an end. This allows the information processing device 200 to save power.

If there is a frame to be transmitted by the own device (step S821), the control section of the information processing device 200 determines whether or not the destination of the frame is an entity other than the master station (step S823). If the destination is an entity other than the master station (step S823), the control section of the information processing device 200 starts transmitting the frame to the destination (step S825). For example, if there are other slave stations connected with the information processing device 200 on a P2P basis, then the destination of the frame can be an entity other than the connected master station (i.e., another slave station).

If the destination is the connected master station (step S823), the control section of the information processing device 200 determines whether or not the scheduled time of frame transmission is later than the time at which the master station will exit sleep mode (step S824). The scheduled time of frame transmission is typically the time at which the waiting duration required for frame transmission will elapse.

If the scheduled time of frame transmission is earlier than the time at which the master station will exit sleep mode (step S824), control is returned to step S821. That is, the control section of the information processing device 200 stops transmission of the frame and enters sleep mode until the sleep duration of the master station comes to an end.

Suppose, for example, that the scheduled time of frame transmission is earlier than the time at which the master station will exit sleep mode. In that case, even if the frame is transmitted as scheduled, the master station is still in sleep mode and unable to receive the frame. Thus if the scheduled time of frame transmission is earlier than the time at which the master station will exit sleep mode, the transmission of the frame is stopped and sleep mode is maintained until the sleep duration of the master station comes to an end. This allows the information processing device 200 to suppress useless transmission and thereby save power.

If the scheduled time of frame transmission is later than the time at which the master station will exit sleep mode (step S824), the control section of the information processing device 200 transmits the frame (step S825). Control is then returned to step S821.

As described above, the control section of the information processing device 200 may determine whether the Sleep frame comes from the master station on the basis of whether or not the source address and the destination address included in the Sleep frame coincide with each other. Also, based on the duration which is included in the Sleep frame and in which the master station will transition to sleep mode, the control section of the information processing device 200 sets the duration in which the information processing device 200 will be in sleep mode (i.e., the duration of the processing performed when the master station is in sleep mode).

If there is any frame to be transmitted to the master station and if the waiting duration required before transmission of the frame is longer than the duration at the end of which the master station will exit sleep mode, the control section of the information processing device 200 performs the transmission processing of the frame.

If there is any frame to be transmitted and if the destination of the frame is an entity other than the master station, the control section of the information processing device 200 performs the transmission processing of the frame.

(Typical Operations of the Transmission Suppression Processing (Slave Stations (Legacy Devices)))

Figure 19:
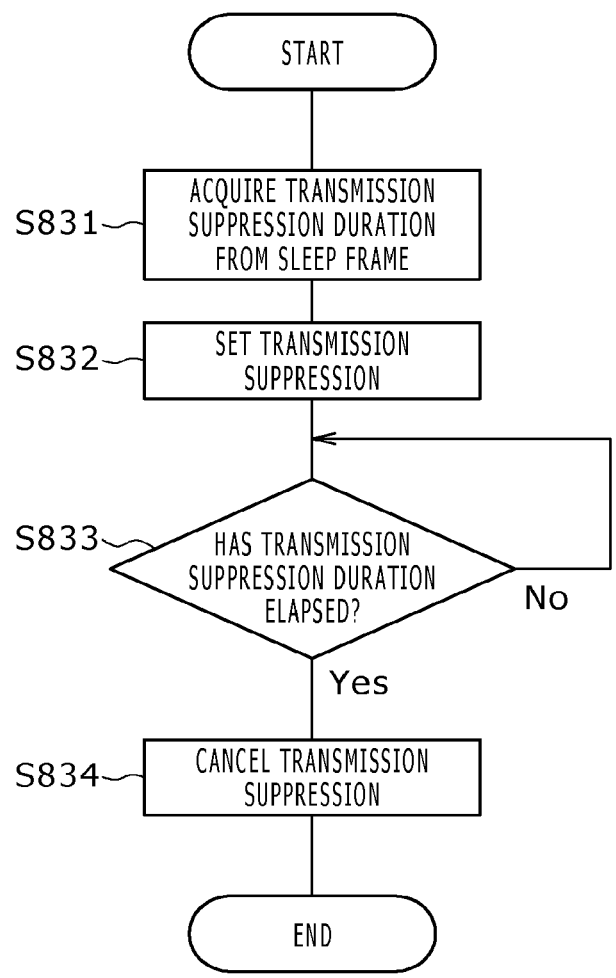
FIG. 19 is a flowchart showing a typical procedure for processing of transmission suppression performed by an information processing device 201 in the first embodiment of the present technology.

FIG. 19 is a flowchart showing a typical procedure for the processing of transmission suppression performed by the information processing device 201 in the first embodiment of the present technology.

As described above, upon receipt of the Sleep frame, the control section (equivalent to the control section 150 shown in FIG. 2) of the information processing device 201 cannot fully interpret the Sleep frame. Still, the control section of the information processing device 201 can interpret part of the information in the Sleep frame (e.g., information in the MAC header).

Thus upon receipt of the Sleep frame, the control section of the information processing device 201 acquires the duration of transmission suppression based on the received Sleep frame (step S831).

Suppose, for example, that the HE PPDU format frame shown in FIG. 5 or the NDP frame shown in FIG. 12 is used as the Sleep frame. In such a case, the control section of the information processing device 201 acquires the L_DATARATE and L_LENGTH values from the L-SIG 313 or 353. The control section of the information processing device 201 then acquires the duration calculated by use of the above-mentioned equation 1 as the transmission suppression duration.

As another example, suppose that the Management frame shown in FIG. 7 or the Control frame shown in FIG. 10 is used as the Sleep frame. In such a case, the duration in which the master station will transition to sleep mode is set in the Duration field 332 or 342. The control section of the information processing device 201 then acquires from the Duration field 332 or 342 the duration in which the master station will be in sleep mode and uses the acquired duration as the transmission suppression duration.

The control section of the information processing device 201 then sets transmission suppression for the duration of transmission suppression thus acquired (step S832).

The control section of the information processing device 201 proceeds to determine whether or not the transmission suppression duration has elapsed (step S833). If the transmission suppression duration has yet to elapse (step S833), the control section keeps monitoring the duration.

If the transmission suppression duration has elapsed (step S833), the control section of the information processing device 201 cancels transmission suppression (step S834).

2. Second Embodiment

Described below is an example of transmitting the Sleep frame in two frames in a second embodiment of the present technology. That is, the second embodiment of the present technology involves dividing the Sleep frame into two frames to be transmitted.

The structure of the information processing device in the second embodiment of the present technology is substantially the same as that of the information processing device 100, 200, or 201 shown in FIG. 1 and in other drawings. The same parts in the second embodiment as those in the first embodiment of the present technology are thus given the same reference numerals and will only be described partially hereunder to avoid redundancy.

(Example of Communication)

Figure 20:
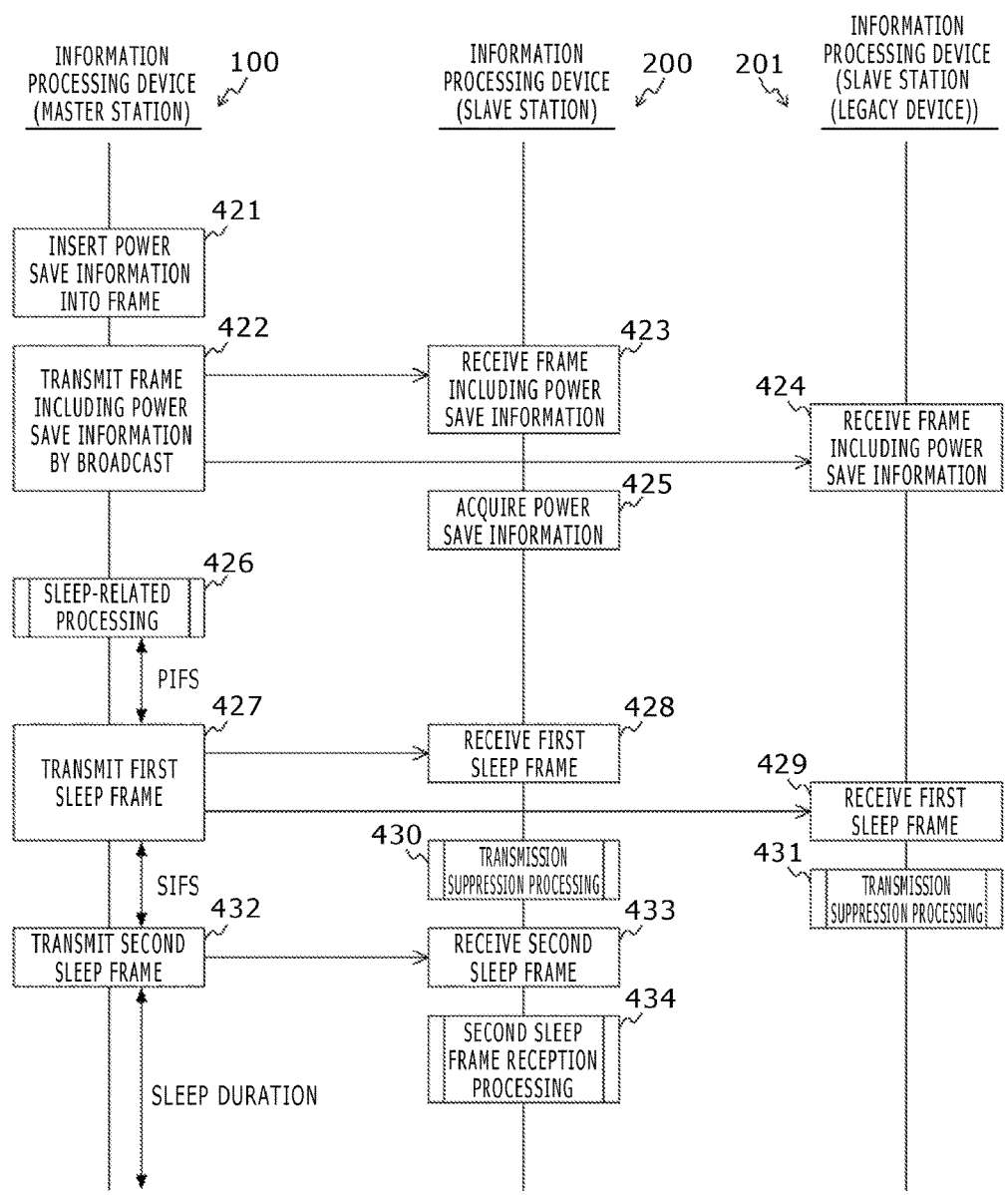
FIG. 20 is a sequence chart showing typical communication processes between devices making up the communication system 10 in a second embodiment of the present technology.

FIG. 20 is a sequence chart showing typical communication processes between devices making up the communication system 10 in the second embodiment of the present technology. Shown in FIG. 20 is an example obtained by partially modifying the example of communication illustrated in FIG. 3. The explanations of the same parts as those in FIG. 3 will be partially omitted hereunder.

Some of the processes (421 to 425) shown in FIG. 20 correspond to some processes in FIGS. 3 (401 to 405).

When the scheduled time of Sleep frame transmission included in the transmitted power save information is reached, the control section 150 of the information processing device 100 transmits a first Sleep frame to the slave stations (427 to 429).

The first Sleep frame is a backward-compatible frame. That is, the first Sleep frame is fully recognized by all slave stations including legacy devices.

By transmitting the first Sleep frame to the slave stations, the master station can suppress the transmission of all slave stations including legacy devices.

After transmitting the first Sleep frame, the control section 150 of the information processing device 100 transmits a second Sleep frame to the slave stations (432 to 434).

The second Sleep frame is a backward-incompatible frame. That is, the second Sleep frame can be received by the slave stations except legacy devices; it cannot be received by the legacy devices.

By transmitting the second Sleep frame to the slave stations, the master station cancels transmission suppression of the slave stations except legacy devices and notifies them of the duration in which the master station will transition to sleep mode. The master station may transmit the second Sleep frame upon elapse of a predetermined frame space (e.g., a short inter frame space (SIFS)) after the transmission of the first Sleep frame.

After transmitting the second Sleep frame to the slave stations (432), the control section 150 of the information processing device 100 sets sleep mode.

Upon receipt of the first Sleep frame (428), the control section of the information processing device 200 performs transmission suppression processing (430).

On receiving the first Sleep frame (429), the control section of the information processing device 201 performs transmission suppression processing (431).

Upon receipt of the second Sleep frame (433), the control section of the information processing device 200 performs second Sleep frame reception processing (434). The second Sleep frame reception processing will be discussed later in detail with reference to FIG. 25.

As described, by transmitting the second Sleep frame after the transmission of the first Sleep frame, the master station can quickly cancel transmission suppression of the slave stations except legacy devices that have received the first Sleep frame.

With the second embodiment of the present technology, the second Sleep frame is transmitted after the transmission of the first Sleep frame as an example. Alternatively, the second Sleep frame may be first transmitted, followed by the first Sleep frame.

(Typical Frame Formats of the First Sleep Frame)

The first Sleep frame is a frame for suppressing the transmission of all slave stations including legacy devices. The slave stations (including legacy devices) having received the first frame perform the transmission suppression processing shown in FIG. 19.

Figure 21:
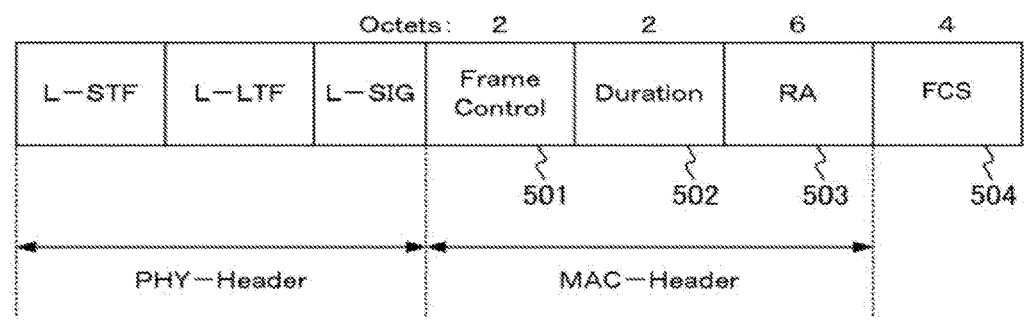
FIG. 21 is a schematic view showing a typical structure of a first Sleep frame transmitted by the information processing device 100 in the second embodiment of the present technology.

For example, the Control frame may be used as the first Sleep frame. The first Sleep frame may be transmitted using the legacy PPDU format. FIG. 21 shows an example of using a clear to send (CTS) frame as the first Sleep frame.

(Example of using the CTS Frame)

FIG. 21 is a schematic view showing a typical structure of the first Sleep frame transmitted by the information processing device 100 in the second embodiment of the present technology. FIG. 21 shows an example of using the CTS frame as the first Sleep frame.

The address of the master station (information processing device 100) is set in an RA field 503.

A Duration field 502 is used to hold information relating to the sleep duration (i.e., the duration in which the master station will transition to sleep mode, plus the duration before the second Sleep frame is transmitted).

Because the master station transitions to sleep mode after transmitting the second Sleep frame, the setting here is the sum of the duration in which the master station will be in sleep mode and the duration before the master station transmits the second Sleep frame.

(Typical Frame Formats of the Second Sleep Frame)

Figure 22:
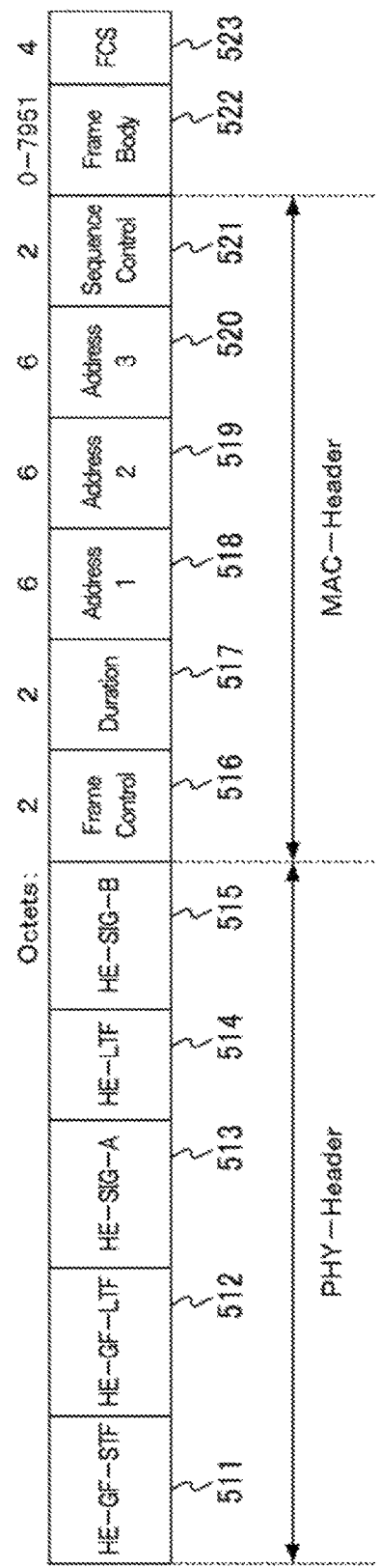
FIG. 22 is a schematic view showing a typical structure of a second Sleep frame transmitted by the information processing device 100 in the second embodiment of the present technology.
Figure 23:
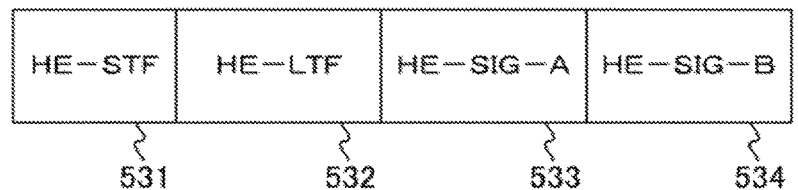
FIG. 23 is a schematic view showing another typical structure of the second Sleep frame transmitted by the information processing device 100 in the second embodiment of the present technology.

FIGS. 22 and 23 are schematic views showing typical structures of the second Sleep frame transmitted by the information processing device 100 in the second embodiment of the present technology. FIG. 22 shows an example of using a backward-incompatible high-efficiency green field (HE GF) PPDU format frame as the second Sleep frame. FIG. 23 shows a variation of the example shown in FIG. 22, with the PHY header using a high-efficiency short training field (HE-STF) 531 and a high-efficiency long training field (HE-LTF) 532.

An HE-GF-STF 511 and an HE-GF-LTF 512 shown in FIG. 22 make up a preamble that can be received using the HE-SIG.

The second Sleep frame is a frame that causes the slave stations except legacy devices to cancel transmission suppression and enables the master station to notify the slave stations except legacy devices of the sleep duration. The legacy devices are incapable of recognizing the sleep function of the master station. Thus by transmitting the second Sleep frame using the frame that can be received only by the slave stations except legacy devices, the master station transmits information only to the slave stations except legacy devices.

Alternatively, the HE PPDU format frame shown in FIG. 5 may be used as the second Sleep frame.

The master station sets in a Frame Control field 516 the identifier indicative of the second Sleep frame. The master station further inserts into a Duration field 517 the duration in which the master station will transition to sleep mode.

Using the above-described second Sleep frame, the master station can notify the slave stations except legacy devices unable to receive the first Sleep frame of the duration in which the master station will transition to sleep mode.

(Example of using the Backward-Incompatible NDP Frame)

FIG. 24 is a schematic view showing another typical structure of the second Sleep frame transmitted by the information processing device 100 in the second embodiment of the present technology. FIG. 24 shows an example of using the backward-incompatible NDP frame as the second Sleep frame.

The master station sets the identifier indicative of the NDP frame being the second Sleep frame in at least either an HE-SIG-A 543 or an HE-SIG-B 545.

The master station may also set in at least either the HE-SIG-A 543 or the HE-SIG-B 545 the duration in which the master station will transition to sleep mode.

As the NDP frame, the format shown in FIG. 23 may be used alternatively.

As described above, the control section 150 of the information processing device 100 transmits, as part of the Sleep frame, the first Sleep frame that causes each slave station to suppress transmission. The control section 150 further transmits, as another part of the Sleep frame, the second Sleep frame of which the information is not recognized by the legacy devices.

(Typical Operations of the Second Sleep Frame Reception Processing (Slave Stations))

Figure 25:
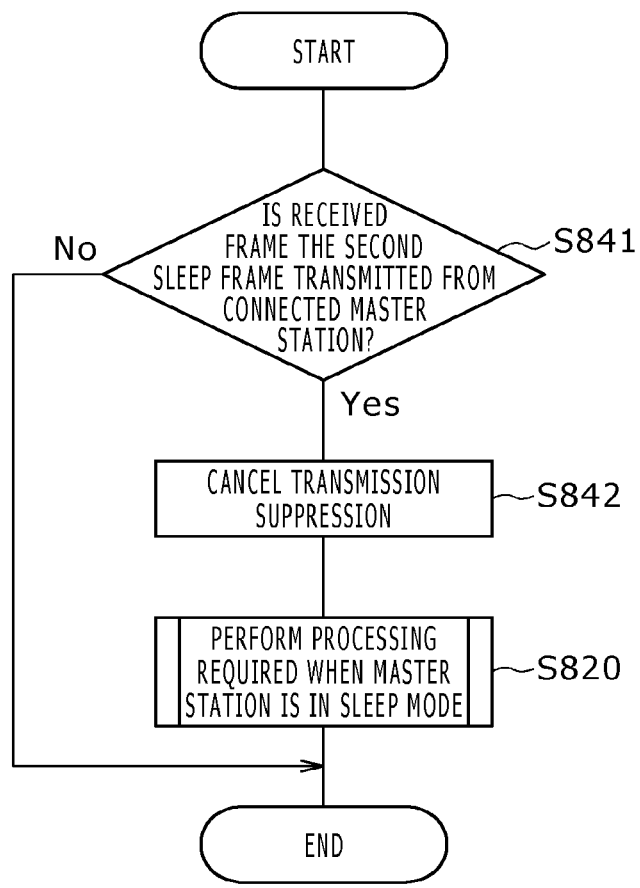
FIG. 25 is a flow chart showing a typical procedure for processing of Sleep frame reception performed by the information processing device 200 in the second embodiment of the present technology.

FIG. 25 is a flow chart showing a typical procedure for the processing of Sleep frame reception performed by the information processing device 200 in the second embodiment of the present technology.

First, based on the content of the received frame, the control section (equivalent to the control section 150 shown in FIG. 2) of the information processing device 200 determines whether or not the frame is the second Sleep frame transmitted from the connected master station (step S841).

For example, on the basis of the information set in the Control frame, the control section of the information processing device 200 may determine whether or not the received frame is the second Sleep frame.

For example, if the NDP frame is used as the second Sleep frame, the control section can determine whether or not the received frame is the second Sleep frame on the basis of the information set in the HE-SIG. Also, if the NDP frame is used as the second Sleep frame, the control section may acquire the master station identifier from the information set in the HE-SIG to determine whether or not the own device is the connected master station.

The control section of the information processing device 200 may acquire from the Duration value the duration in which the master station will transition to sleep mode. For example, if the NDP frame is used as the second Sleep frame, the control section may obtain from the HE-SIG the duration in which the master station will be in sleep mode.

If the received frame is the second Sleep frame transmitted from the connected master station (step S841), the control section of the information processing device 200 cancels transmission suppression (step S842). The control section of the information processing device 200 proceeds to perform the processing required when the master station is in sleep mode (step S820). The processing is the same as shown in FIG. 18 and thus will not be discussed further.

As described, where the slave stations compatible with the sleep function of the master station coexist with the slave stations (legacy devices) incompatible with the sleep function of the master station, the embodiment of the present technology enables the master station to transition appropriately to sleep mode. That is, the slave stations compatible with the sleep function of the master station are notified of the sleep duration of the master station, while the slave stations (legacy devices) incompatible with the sleep function of the master station are caused to suppress transmission.

3. Applications

The technology of the present disclosure can be applied to varieties of products. For example, the information processing devices 100, 200, and 201 may each be implemented as a mobile terminal such as a smartphone, a tablet personal computer (PC), a laptop PC, a portable game terminal, or a digital camera; as a fixed terminal such as a television set, a printer, a digital scanner, or network storage; or as an in-vehicle terminal such as a car navigation device. Alternatively, the information processing devices 100, 200, and 201 may each be implemented as a terminal that performs machine-to-machine (M2M) communication (also known as a machine type communication (MTC) terminal) such as a smart meter, an automatic vending machine, a remote monitoring device, or a point-of-sale (POS) terminal. As another alternative, the information processing devices 100, 200, and 201 may each be implemented as a wireless communication module (e.g., an integrated circuit module formed by a single die) to be mounted on the above-mentioned terminals.

Meanwhile, the information processing device 100 may be implemented as a wireless LAN access point (also called a wireless base station) that may or may not include router functions. Alternatively, the information processing device 100 may be implemented as a mobile wireless LAN router. As another alternative, the information processing device 100 may be a wireless communication module (e.g., an integrated circuit module formed by a single die) to be mounted on the above-mentioned devices.

3-1. First Application

Figure 26:
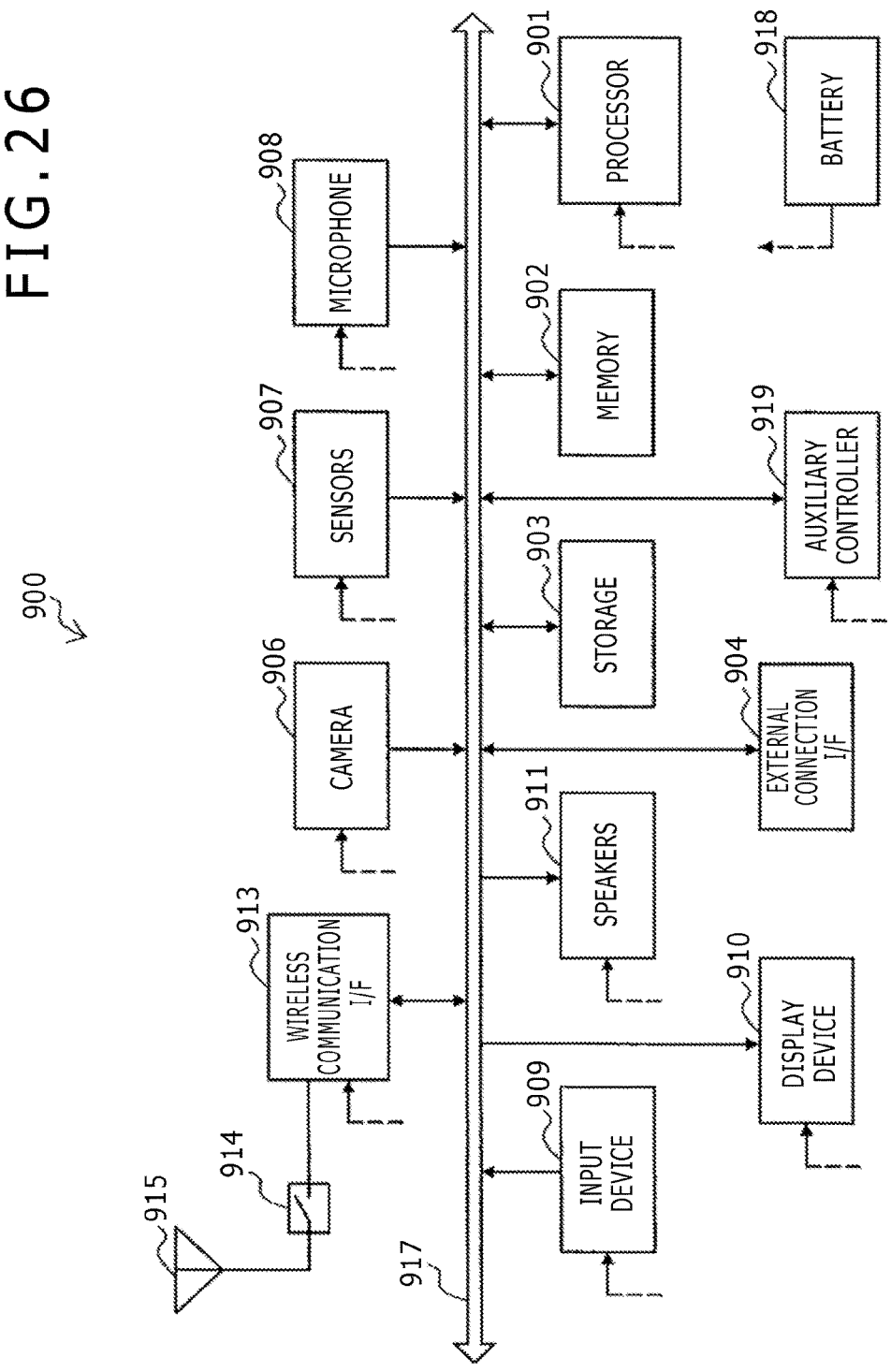
FIG. 26 is a block diagram showing a typical schematic structure of a smartphone.

FIG. 26 is a block diagram showing a typical schematic structure of a smartphone 900 to which the technology of the present disclosure may be applied. The smartphone 900 includes a processor 901, a memory 902, storage 903, an external connection interface 904, a camera 906, sensors 907, a microphone 908, an input device 909, a display device 910, speakers 911, a wireless communication interface 913, an antenna switch 914, an antenna 915, a bus 917, a battery 918, and an auxiliary controller 919.

The processor 901 may be a central processing unit (CPU) or a system-on-chip (SoC), for example, which controls the functions of the application layer and other layers of the smartphone 900. The memory 902 includes a random access memory (RAM) and a read-only memory (ROM) storing the programs and data to be executed or operated on by the processor 901. The storage 903 may include a storage medium such as a semiconductor memory or a hard disk. The external connection interface 904 is an interface that connects an external device such as a memory card or a universal serial bus (USB) device to the smartphone 900.

The camera 906 may have an image sensor such as a charge-coupled device (CCD) or complementary metal oxide semiconductors (CMOS) for generating captured images. The sensors 907 may have a group of sensors including a positioning sensor, a gyro sensor, a geomagnetic sensor, and an acceleration sensor. The microphone 908 converts to an audio signal the sound input to the smartphone 900. The input device 909 may include a touch sensor, a keypad, a keyboard, buttons, or switches for detecting touches on a screen of the display device 910. As such, the input device 909 receives operations or information input from the user. The display device 910 has a screen such as a liquid crystal display (LCD) or an organic light-emitting diode (OLED) display that displays images output from the smartphone 900. The speakers 911 convert to sound the audio signal output from the smartphone 900.

The wireless communication interface 913 supports at least one of the wireless LAN standards such as IEEE 802.11a, 802.11b, 802.11g, 802.11n, 802.11ac, and 802.11ad, and performs wireless communication accordingly. In infrastructure mode, the wireless communication interface 913 communicates with another device via a wireless LAN access point. In direct communication mode such as ad-hoc mode or Wi-Fi Direct mode, the wireless communication interface 913 communicates directly with another device. In Wi-Fi Direct mode, unlike in ad-hoc mode, one of the two terminals involved operates as an access point. These terminals communicate directly with each other. Typically, the wireless communication interface 913 may include a baseband processor, a radio frequency (RF) circuit, and a power amplifier. The wireless communication interface 913 may be a one-chip module integrating a memory that stores communication control programs, a processor that executes the programs, and related circuits. In addition to the wireless LAN system, the wireless communication interface 913 may support other wireless communication systems such as near field communication, close proximity communication, and cellular communication. The antenna switch 914 switches the antenna 915 to connect to one of multiple circuits included in the wireless communication interface 913 (e.g., to one of different wireless communication system circuits). The antenna 915 has one or multiple antenna elements (e.g., multiple antenna elements make up a multiple-input multiple-output (MIMO) antenna) and is used for the transmission and reception of radio signals via the wireless communication interface 913.

The example shown in FIG. 26 is not limitative of the smartphone 900. The smartphone 900 may have multiple antennas (e.g., a wireless LAN antenna and an antenna for the close proximity communication system). In such a case, the antenna switch 914 may be omitted from the structure of the smartphone 900.

The bus 917 interconnects the processor 901, the memory 902, the storage 903, the external connection interface 904, the camera 906, the sensors 907, the microphone 908, the input device 909, the display device 910, the speakers 911, the wireless communication interface 913, and the auxiliary controller 919. The battery 918 supplies power to each of the blocks of the smartphone 900 shown in FIG. 26 via feeder lines partially indicated by broken lines in the drawing. The auxiliary controller 919 operates a minimum of functions of the smartphone 900 in sleep mode, for example.

In the smartphone 900 shown in FIG. 26, the control section 150 discussed above using FIG. 2 may be included in the wireless communication interface 913. At least some of the above-mentioned functions may be included in the processor 901 or in the auxiliary controller 919.

The smartphone 900 may operate as a wireless access point (software AP) when the processor 901 executes an access point function on the application level. Alternatively, the wireless communication interface 913 may have a wireless access point function.

3-2. Second Application

Figure 27:
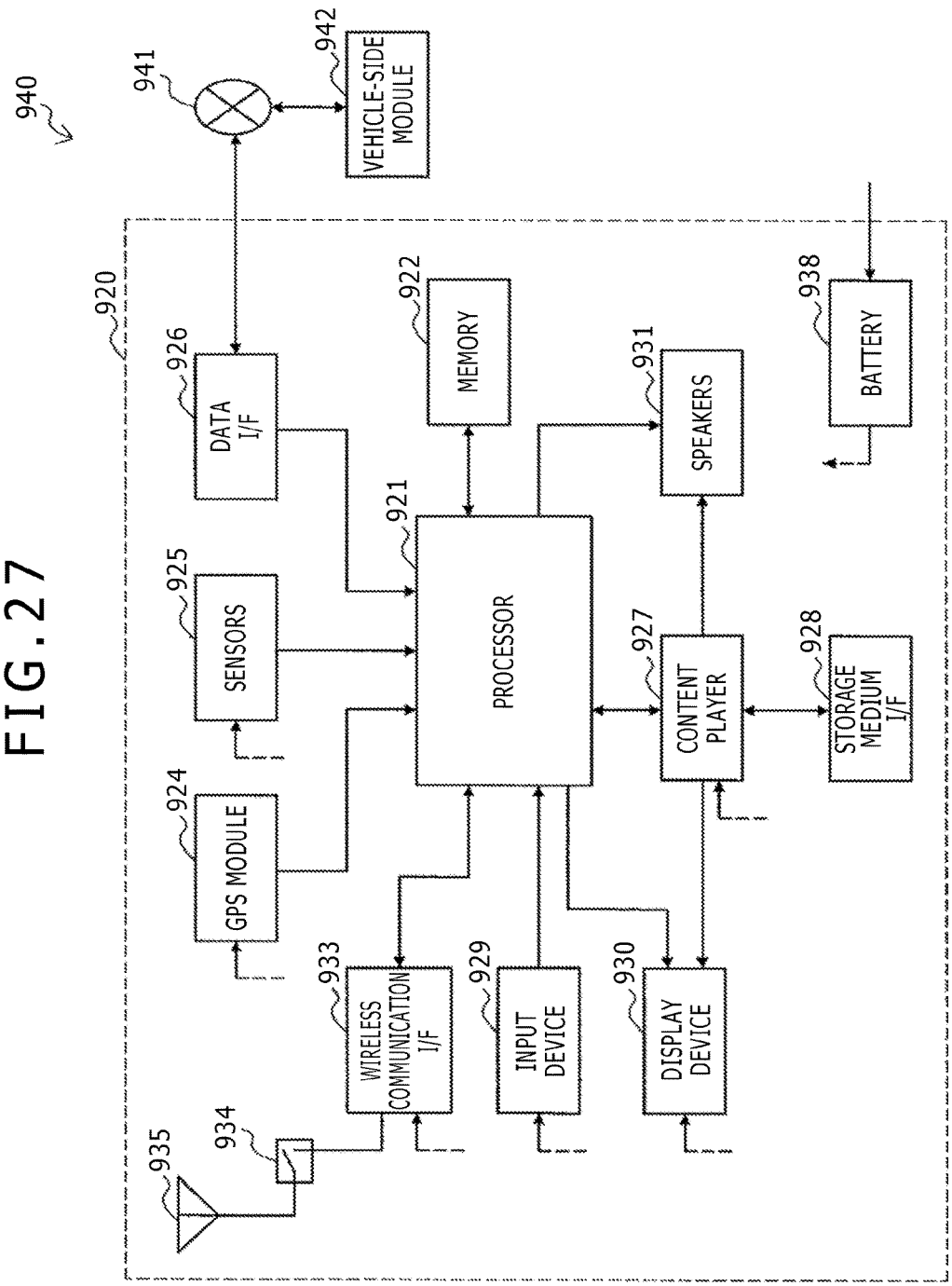
FIG. 27 is a block diagram showing a typical schematic structure of a car navigation device.

FIG. 27 is a block diagram showing a typical schematic structure of a car navigation device 920 to which the technology of the present disclosure may be applied. The car navigation device 920 includes a processor 921, a memory 922, a global positioning system (GPS) module 924, sensors 925, a data interface 926, a content player 927, a storage medium interface 928, an input device 929, a display device 930, speakers 931, a wireless communication interface 933, an antenna switch 934, an antenna 935, and a battery 938.

The processor 921 may be a CPU or a SoC that controls the navigation function and other functions of the car navigation device 920. The memory 922 includes a RAM and a ROM storing the programs and data to be executed or operated on by the processor 921.

The GPS module 924 measures the position of the car navigation device 920 (e.g., in terms of latitude, longitude, and altitude) using GPS signals received from GPS satellites. The sensors 925 may have a group of sensors including a gyro sensor, a geomagnetic sensor, and an atmospheric pressure sensor, for example. The data interface 926 is connected via a terminal, not shown, with an in-vehicle network 941 to acquire data such as vehicle velocity data generated on the side of the vehicle.

The content player 927 reproduces content stored on the storage medium (e.g., CD or DVD) inserted into the storage medium interface 928. The input device 929 may include a touch sensor, buttons, or switches for detecting touches on a screen of the display device 930. As such, the input device 929 receives operations or information input from the user. The display device 930 has a screen such as an LCD or an OLED display that displays images generated by the navigation function or images of reproduced content. The speakers 931 output the sound generated by the navigation function or the sound of reproduced content.

The wireless communication interface 933 supports at least one of the wireless LAN standards such as IEEE 802.11a, 802.11b, 802.11g, 802.11n, 802.11ac, and 802.11ad, and performs wireless communication accordingly. In infrastructure mode, the wireless communication interface 933 communicates with another device via a wireless LAN access point. In direct communication mode such as ad-hoc mode or Wi-Fi Direct mode, the wireless communication interface 933 communicates directly with another device. Typically, the wireless communication interface 933 may include a baseband processor, an RF circuit, and a power amplifier. The wireless communication interface 933 may be a one-chip module integrating a memory that stores communication control programs, a processor that executes the programs, and related circuits. In addition to the wireless LAN system, the wireless communication interface 933 may support other wireless communication systems such as near field communication, close proximity communication, and cellular communication. The antenna switch 934 switches the antenna 935 to connect to one of multiple circuits included in the wireless communication interface 933. The antenna 935 has one or multiple antenna elements and is used for the transmission and reception of radio signals via the wireless communication interface 933.

The example shown in FIG. 27 is not limitative of the car navigation device 920. The car navigation device 920 may have multiple antennas. In such a case, the antenna switch 934 may be omitted from the structure of the car navigation device 920.

The battery 938 supplies power to each of the blocks of the car navigation device 920 shown in FIG. 27 via feeder lines partially indicated by broken lines in the drawing. The battery 938 accumulates power supplied from the vehicle.

In the car navigation device 920 shown in FIG. 27, the control section 150 discussed above using FIG. 2 may be included in the wireless communication interface 933. At least some of the above-mentioned functions may be included in the processor 921.

The wireless communication interface 933 may operate as the above-described information processing device 100 to provide wireless connection for a terminal possessed by the user riding in the vehicle.

The technology of the present disclosure may be implemented in the form of an in-vehicle system (or vehicle) 940 including at least one of the blocks of the above-described car navigation device 920, the in-vehicle network 941, and a vehicle-side module 942. The vehicle-side module 942 generates vehicle-side data such as vehicle velocity, engine revolutions, and failure information and outputs the generated data to the in-vehicle network 941.

3-3. Third Application

Figure 28:
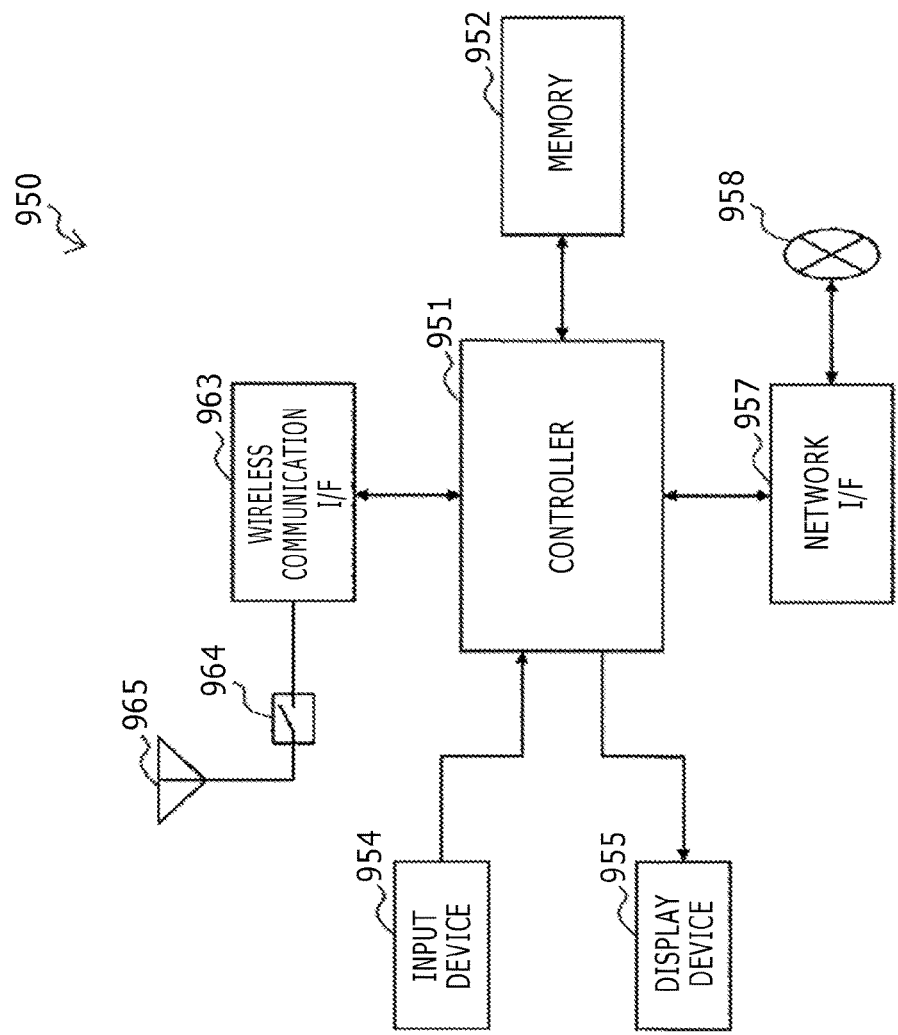
FIG. 28 is a block diagram showing a typical schematic structure of a wireless access point.

FIG. 28 is a block diagram showing a typical schematic structure of a wireless access point 950 to which the technology of the present disclosure may be applied. The wireless access point 950 has a controller 951, a memory 952, an input device 954, a display device 955, a network interface 957, a wireless communication interface 963, an antenna switch 964, and an antenna 965.

The controller 951 may be a CPU or a digital signal processor (DSP) that performs various functions in the internet protocol (IP) layer and upper layers of the wireless access point 950 (e.g., access restriction, routing, encryption, fire wall, and log management). The memory 952 includes a RAM and a ROM storing the programs and diverse control data to be executed or operated on by the controller 951 (e.g., the control data include terminal list, routing table, encryption keys, security settings, and logs).

The input device 954 includes buttons or switches, for example, which receive operations from the user. The output device 955 includes LED lamps indicating the operation status of the wireless access point 950.

The network interface 957 is a wired communication interface for connecting the wireless access point 950 to a wired communication network 958. The network interface 957 may have multiple connection terminals. The wired communication network 958 may be a LAN such as the Ethernet (registered trademark) or a wide area network (WAN).

The wireless communication interface 963 supports at least one of the wireless LAN standards such as IEEE 802.11a, 802.11b, 802.11g, 802.11n, 802.11ac, and 802.11ad, and enables the access point to provide nearby terminals with wireless connection. Typically, the wireless communication interface 963 may include a baseband processor, an RF circuit, and a power amplifier. The wireless communication interface 963 may be a one-chip module integrating a memory that stores communication control programs, a processor that executes the programs, and related circuits. The antenna switch 964 switches the antenna 965 to connect to one of multiple circuits included in the wireless communication interface 963. The antenna 965 has one or multiple antenna elements and is used for the transmission and reception of radio signals via the wireless communication interface 963.

At the wireless access point 950 shown in FIG. 28, the control section 150 discussed above using FIG. 2 may be included in the wireless communication interface 963. At least some of the above-mentioned functions may be included in the controller 951.

The embodiments described above are merely examples in which the present technology may be implemented. The particulars of the embodiments correspond basically to the inventive matters claimed in the appended claims. Likewise, the inventive matters named in the appended claims correspond basically to the particulars of the embodiments with the same names in the foregoing description of the preferred embodiments of the present technology. However, these embodiments and other examples are not limitative of the present technology that may also be implemented using various modifications and alterations of the embodiments so far as they are within the scope of the appended claims.

The procedures discussed above in connection with the embodiments may be construed as constituting a method having a series of such procedures. Also, the procedures may be construed as forming a program for causing a computer to execute a series of such procedures, or a recording medium storing such a program. The recording medium may be a CD, a minidisc (MD), a DVD, a memory card, or a Blu-ray (registered trademark) disc, for example.

The advantageous effects stated in the above description are only examples and not limitative of the present technology that may also provide other advantages.

The present technology may be constituted as follows:

(1)
An information processing device including a control section configured such that when the information processing device in a first mode transitions to a second mode in which the information processing device consumes power differently than in the first mode, the control section performs control to transmit at least one frame including information for notifying a first device compatible with the second mode that the information processing device will transition to the second mode, the frame further including information for causing a second device incompatible with the second mode to suppress transmission.

(2)
The information processing device as stated in paragraph (1) above, in which, on the basis of a determining rule, the control section postpones a scheduled time of transmitting the frame before transmitting the frame.

(3)
The information processing device as stated in paragraph (1) or (2) above, in which the control section notifies the first device and the second device of a scheduled time of transmitting the frame before transmitting the frame.

(4)
The information processing device as stated in paragraph (2) or (3) above, in which the control section transmits the scheduled time using a broadcast frame.

(5)
The information processing device as stated in paragraph (2) above, in which the control section bases the determining rule on information relating to the frame transmitted to the information processing device.

(6)
The information processing device as stated in paragraph (1) above, in which the control section stops transmission of the frame on the basis of a determining rule.

(7)
The information processing device as stated in paragraph (6) above, in which the control section bases the determining rule on the receipt from an upper layer of data destined for another information processing device connected with the information processing device by a scheduled time of transmitting the frame.

(8)
The information processing device as stated in paragraph (6) above, in which the control section bases the determining rule on the receipt of another frame destined for the information processing device by a scheduled time of transmitting the frame.

(9)
The information processing device as stated in paragraphs (1) to (8) above, in which the control section transmits as part of the frame a first frame for causing the first device and the second device to suppress transmission.

(10)
The information processing device as stated in paragraph (9) above, in which the control section transmits as part of the frame a second frame of which the information is not recognized by the second device.

(11)
The information processing device as stated in any one of paragraphs (1) to (10) above, in which the control section inserts into the frame an identifier for identifying the information processing device and duration information for specifying duration in which the information processing device will transition to the second mode before transmitting the frame.

(12)
The information processing device as stated in paragraph (11) above, in which the control section inserts the identifier and the duration information into at least either a PHY header or a MAC header of the frame before transmitting the frame.

(13)
The information processing device as stated in any one of paragraphs (1) to (12) above, in which the control section sets a destination of the frame for the information processing device.

(14)
The information processing device as stated in any one of paragraphs (1) to (13) above, in which, as a waiting duration before transmitting the frame, the control section sets a duration guaranteed to be shorter than the duration in which each of the first device and the second device waits for transmission.

(15)
An information processing device including a communication section configured to receive a frame transmitted by another information processing device in a first mode for notifying that the other information processing device will transition to a second mode in which the other information processing device consumes power differently than in the first mode, the frame including information for enabling the other information processing device to notify a first device compatible with the second mode that the other information processing device will transition to the second mode, the frame further including information for causing a second device incompatible with the second mode to suppress transmission. The information processing device further includes a control section configured to perform control regarding the transmission of the own device on the basis of the information included in the frame.

(16)
The information processing device as stated in paragraph (15) above, in which the control section determines whether the frame is for notifying that the other information processing device will transition to the second mode on the basis of whether or not a source address and a destination address included in the frame coincide with each other.

(17)
The information processing device as stated in paragraph (15) or (16) above, in which the control section sets a duration in which the own device will transition to the second mode on the basis of a duration included in the frame as the duration in which the other information processing device will transition to the second mode.

(18)
The information processing device as stated in any one of paragraphs (15) to (17) above, in which, if there is a frame to be transmitted to the other information processing device and if a waiting duration required before transmitting the frame is longer than a duration at the end of which the other information processing device will exit the second mode, the control section performs processing of transmitting the frame.

(19)
The information processing device as stated in any one of paragraphs (15) to (18) above, in which, if there is a frame to be transmitted and if the frame is destined for an entity other than the other information processing device, the control section performs processing of transmitting the frame.

(20)
An information processing method including a procedure for use when an information processing device in a first mode transitions to a second mode in which the information processing device consumes power differently than in the first mode, the procedure being used to transmit at least one frame including information for notifying a first device compatible with the second mode that the information processing device will transition to the second mode, the frame further including information for causing a second device incompatible with the second mode to suppress transmission.

REFERENCE SIGNS LIST

10 Communication system
100 Information processing device
110 Data processing section
120 Communication section
121 Signal processing portion
122 Wireless interface portion
123 Channel estimation portion
130 Antenna
140 Storage section
150 Control section
200 Information processing device (slave station)
201 Information processing device (slave station)
900 Smartphone
901 Processor
902 Memory
903 Storage
904 External connection interface
906 Camera
907 Sensors
908 Microphone
909 Input device
910 Display device
911 Speakers
913 Wireless communication interface
914 Antenna switch
915 Antenna
917 Bus
918 Battery
919 Auxiliary controller
920 Car navigation device
921 Processor
922 Memory
924 GPS module
925 Sensors
926 Data interface
927 Content player
928 Storage medium interface
929 Input device
930 Display device
931 Speakers
933 Wireless communication interface
934 Antenna switch
935 Antenna
938 Battery
941 In-vehicle network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing device comprising:
circuitry configured such that when the information processing device in a first mode transitions to a second mode in which the information processing device consumes power differently than in the first mode, the circuitry performs control to transmit at least one frame including information notifying a first device compatible with the second mode that the information processing device is to transition to the second mode, the frame further including information causing a second device incompatible with the second mode to suppress transmission.

2. The information processing device according to claim 1, wherein, on the basis of a determining rule, the circuitry postpones a scheduled time of transmitting the frame before transmitting the frame.

3. The information processing device according to claim 1, wherein the circuitry notifies the first device and the second device of a scheduled time of transmitting the frame before transmitting the frame.

4. The information processing device according to claim 2, wherein the circuitry transmits the scheduled time using a broadcast frame.

5. The information processing device according to claim 2, wherein the circuitry bases the determining rule on information relating to the frame transmitted to the information processing device.

6. The information processing device according to claim 1, wherein the circuitry stops transmission of the frame on the basis of a determining rule.

7. The information processing device according to claim 6, wherein the circuitry bases the determining rule on the receipt from an upper layer of data destined for another information processing device connected with the information processing device by a scheduled time of transmitting the frame.

8. The information processing device according to claim 6, wherein the circuitry bases the determining rule on the receipt of another frame destined for the information processing device by a scheduled time of transmitting the frame.

9. The information processing device according to claim 1, wherein the circuitry transmits as part of the frame a first frame causing the first device and the second device to suppress transmission.

10. The information processing device according to claim 9, wherein the circuitry transmits as part of the frame a second frame of which the information is not recognized by the second device.

11. The information processing device according to claim 1, wherein the circuitry inserts into the frame an identifier identifying the information processing device and duration information specifying duration in which the information processing device is to transition to the second mode before transmitting the frame.

12. The information processing device according to claim 11, wherein the circuitry inserts the identifier and the duration information into at least either a physical layer header or a media access control header of the frame before transmitting the frame.

13. The information processing device according to claim 1, wherein the circuitry sets a destination of the frame for the information processing device.

14. The information processing device according to claim 1, wherein, as a waiting duration before transmitting the frame, the circuitry sets a duration guaranteed to be shorter than the duration in which each of the first device and the second device waits for transmission.

15. An information processing device comprising:
- a communication interface configured to receive a frame transmitted by another information processing device in a first mode notifying that the other information processing device is to transition to a second mode in which the other information processing device consumes power differently than in the first mode, the frame including information enabling the other information processing device to notify a first device compatible with the second mode that the other information processing device is to transition to the second mode, the frame further including information causing a second device incompatible with the second mode to suppress transmission; and
- circuitry configured to perform control regarding the transmission of the own device on the basis of the information included in the frame.

16. The information processing device according to claim 15, wherein the circuitry determines whether the frame is for notifying that the other information processing device is to transition to the second mode on the basis of whether or not a source address and a destination address included in the frame coincide with each other.

17. The information processing device according to claim 15, wherein the circuitry sets a duration in which the own device is to transition to the second mode on the basis of a duration included in the frame as the duration in which the other information processing device is to transition to the second mode.

18. The information processing device according to claim 15, wherein, if there is a frame to be transmitted to the other information processing device and if a waiting duration required before transmitting the frame is longer than a duration at the end of which the other information processing device is to exit the second mode, the circuitry performs processing of transmitting the frame.

19. The information processing device according to claim 15, wherein, if there is a frame to be transmitted and if the frame is destined for an entity other than the other information processing device, the circuitry performs processing of transmitting the frame.

20. An information processing method comprising:
- transmitting, when an information processing device in a first mode transitions to a second mode in which the information processing device consumes power differently than in the first mode, at least one frame including information notifying a first device compatible with the second mode that the information processing device is to transition to the second mode, the frame further including information causing a second device incompatible with the second mode to suppress transmission.

* * * * *